United States Patent
Eravelli et al.

(10) Patent No.: US 9,674,803 B2
(45) Date of Patent: Jun. 6, 2017

(54) OUT-OF SYNCHRONIZATION DETECTION AND CORRECTION DURING COMPRESSION

(71) Applicant: QUALCOMM Incorporated, San Diego, CA (US)

(72) Inventors: Srinivasa Rao Eravelli, San Diego, CA (US); Sitaramanjaneyulu Kanamarlapudi, San Diego, CA (US); Rohit Kapoor, San Diego, CA (US); Sivaram Srivenkata Palakodety, San Diego, CA (US); Venkata Ramanan Venkatachalam Jayaraman, Del Mar, CA (US); Murtuza Taheri Chhatriwala, San Diego, CA (US); Sumanth Govindappa, San Diego, CA (US); Pamela Ann Cereck, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 424 days.

(21) Appl. No.: 14/312,423

(22) Filed: Jun. 23, 2014

(65) Prior Publication Data

US 2015/0085835 A1    Mar. 26, 2015

Related U.S. Application Data

(60) Provisional application No. 61/891,314, filed on Oct. 15, 2013, provisional application No. 61/887,795, (Continued)

(51) Int. Cl.
*H04J 3/00* (2006.01)
*H04W 56/00* (2009.01)
(Continued)

(52) U.S. Cl.
CPC .......... *H04W 56/001* (2013.01); *H04L 69/04* (2013.01); *H04W 72/042* (2013.01); *H04L 69/22* (2013.01); *H04W 76/028* (2013.01)

(58) Field of Classification Search
CPC ............................. H04L 69/22; H04L 69/04
See application file for complete search history.

(56) References Cited

U.S. PATENT DOCUMENTS

| 6,608,841 B1 | 8/2003 | Koodli |
| 6,751,209 B1 | 6/2004 | Hamiti et al. |
| (Continued) | | |

FOREIGN PATENT DOCUMENTS

| EP | 1 928 130 A2 | 6/2008 |
| WO | WO-2012/175132 A1 | 12/2012 |

OTHER PUBLICATIONS

Bormann C., et al., "Robust Header Compression (RoHC): Framework and four profiles: RTP, UDP, ESP and uncompressed," Internet Engineering Task Force, (RFC) 3095, Jul. 2001, pp. 1-168.
(Continued)

*Primary Examiner* — Mark Rinehart
*Assistant Examiner* — Matthew Hopkins
(74) *Attorney, Agent, or Firm* — Arent Fox LLP

(57) ABSTRACT

Methods and apparatus are described for synchronizing compression for communication between a user equipment (UE) and a serving node. The methods and apparatus include determining that a compressor memory of a compressor and a decompressor memory of a decompressor are out-of-synchronization based on a checksum failure. Further, the methods and apparatus include resetting the compressor memory and the decompressor memory to a predetermined state in response to determining that the compressor memory and the decompressor memory are out-of-synchronization,
(Continued)

wherein the compressor memory and the decompressor memory are synchronized at the predetermined state.

22 Claims, 12 Drawing Sheets

Related U.S. Application Data filed on Oct. 7, 2013, provisional application No. 61/882,429, filed on Sep. 25, 2013, provisional application No. 61/881,602, filed on Sep. 24, 2013, provisional application No. 61/881,308, filed on Sep. 23, 2013.

(51) Int. Cl.
*H04W 72/04* (2009.01)
*H04L 29/06* (2006.01)
*H04W 76/02* (2009.01)

(56) References Cited

U.S. PATENT DOCUMENTS

| | | | |
|---|---|---|---|
| 2002/0059464 A1 | 5/2002 | Hata et al. | |
| 2007/0058679 A1 | 3/2007 | Pelletier et al. | |
| 2007/0211724 A1* | 9/2007 | Johansson | H04L 49/00 370/392 |
| 2008/0080559 A1 | 4/2008 | Singh | |
| 2009/0034466 A1* | 2/2009 | Lindskog | H04L 1/0078 370/329 |
| 2010/0098109 A1 | 4/2010 | Le Pennec et al. | |
| 2013/0022032 A1 | 1/2013 | Taghavi Nasrabadi et al. | |
| 2013/0064177 A1 | 3/2013 | Venkatachalam et al. | |
| 2015/0016475 A1 | 1/2015 | Govindappa et al. | |

OTHER PUBLICATIONS

International Search Report and Written Opinion—PCT/US2014/056248—ISA/EPO—Jan. 16, 2015. (14 total pages).

Pelletier S. G., et al., "The Robust Header Compression (ROHC) Framework; rfc5795.txt", The Robust Header Compression (ROHC) Framework; RFC5795.TXT, Internet Engineering Task Force, IETF; Standard, Internet Society (ISOC) 4, Rue Des Falaises CH-1205 Geneva, Switzerland, XP015068232, Mar. 19, 2010 (Mar. 19, 2010), pp. 1-41.

Sandlund P. K., et al., "Robust Header Compression (ROHC): A Profile for TCP/IP (ROHC-TCP); rfc4996.txt", Jul. 1, 2007, XP015052530, ISSN: 0000-0003, Jul. 1, 2007 (Jul. 1, 2007), p. 14.

* cited by examiner

OUT-OF SYNCHRONIZATION DETECTION AND CORRECTION DURING COMPRESSION

CLAIM OF PRIORITY UNDER 35 U.S.C. §119

The present application for patent claims priority to:
U.S. Application No. 61/891,314 entitled "Recovery Mechanism During Compression Logics" filed Oct. 15, 2013;
U.S. Application No. 61/887,795 entitled "Methods and Apparatus for Uplink Data Compression Using Header-Only Compression and Out-of-Sync Detection" filed Oct. 7, 2013;
U.S. Application No. 61/882,429 entitled "Method to Detect Out of Synchronization Between Peer Entities in Up Link Compression and Remedy It" filed Sep. 25, 2013;
U.S. Application No. 61/881,602 entitled "Method to Synchronize the Two Ends of Uplink Compression in Case of Failures in a Cellular Network" filed Sep. 24, 2013; and
U.S. Application No. 61/881,308 entitled "Method to Recover from Failures for IP Data Compression in a Cellular Network" filed Sep. 23, 2013; and
wherein the above applications are assigned to the assignee hereof and are hereby expressly incorporated by reference herein.

BACKGROUND

Aspects of the present disclosure relate generally to telecommunication systems, and more particularly, to an apparatus and method for a telecommunication system to detect out-of-synchronization between a compressor component and decompressor component, and correcting the out-of-synchronization issue, thereby providing consistent service in a wireless communication system.

Wireless and wire-line communication networks are widely deployed to provide various communication services such as telephony, video, data, messaging, broadcasts, and so on. Such networks, which are usually multiple access networks, support communications for multiple users by sharing the available network resources. One example of such a network is the UMTS Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). The UMTS also supports enhanced 3G data communications protocols, such as High Speed Packet Access (HSPA), which provides higher data transfer speeds and capacity to associated UMTS networks.

In some instances, a compressor and a decompressor respectively of a transmitting device and a receiving device, such as a mobile user equipment (UE) and a corresponding access network device, may become out-of-synchronization. For example, when an out-of-synchronization condition occurs, when a decompressor decompresses the compressed transmitted data packet, then the decompressed transmitted data packet may not correspond to the original data packet that was transmitted. As such, since the decompressed data packet and the original data packet do not match, the transmitting and receiving devices, e.g., the UE and the access network, cannot communicate properly.

Thus, improvements in transmitting compressed data packets within a wireless communication system are desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with an aspect, a method for synchronizing compression for communication between a user equipment (UE) and a serving node is described. The method includes determining that a compressor memory of a compressor and a decompressor memory of a decompressor are out-of-synchronization based on a checksum failure. Further, the methods includes resetting the compressor memory and the decompressor memory to a predetermined state in response to determining that the compressor memory and the decompressor memory are out-of-synchronization, wherein the compressor memory and the decompressor memory are synchronized at the predetermined state.

An apparatus for synchronizing compression for communication between a user equipment (UE) and a serving node is described. The apparatus includes means for determining that a compressor memory of a compressor and a decompressor memory of a decompressor are out-of-synchronization based on a checksum failure. Further, the apparatus includes means for resetting the compressor memory and the decompressor memory to a predetermined state in response to determining that the compressor memory and the decompressor memory are out-of-synchronization, wherein the compressor memory and the decompressor memory are synchronized at the predetermined state.

An apparatus for synchronizing compression for communication between a user equipment (UE) and a serving node is described. The apparatus includes a determining component configured to determine that a compressor memory of a compressor and a decompressor memory of a decompressor are out-of-synchronization based on a checksum failure. Further, the apparatus includes a resetting component configured to reset the compressor memory and the decompressor memory to a predetermined state in response to determining that the compressor memory and the decompressor memory are out-of-synchronization, wherein the compressor memory and the decompressor memory are synchronized at the predetermined state.

Further aspects provide a computer-readable medium storing computer executable code for synchronizing compression for communication between a user equipment (UE) and a serving node is described. The computer-readable medium includes code for determining that a compressor memory of a compressor and a decompressor memory of a decompressor are out-of-synchronization based on a checksum failure. Additionally, the computer-readable medium includes code for resetting the compressor memory and the decompressor memory to a predetermined state in response to determining that the compressor memory and the decompressor memory are out-of-synchronization, wherein the compressor memory and the decompressor memory are synchronized at the predetermined state.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components are shown in block diagram form in order to avoid obscuring such concepts. In an aspect, the term "component" as used herein may be one of the parts that make up a system, may be hardware or software, and may be divided into other components.

The present aspects generally relate to efficiently detecting out-of-synchronization between a compressor component and decompressor component and correcting the out-of-synchronization issue. Specifically, during compression, incoming data packets are added a compressor memory. The compressor may look for repetitions in the data packets by comparing data strings in the data packets that match data strings stored in the compressor memory. The compressor may then compress the data packet by, among other things, replacing a matching, e.g., repetitive, data strings in the data packet with a pointer referencing the location where the data string is stored in the compressor memory. Then, the compressor may transmit the compressed data packet to a decompressor for decompression. A decompressor maintains a decompressor memory that is synchronized with the compressor memory. As such, the decompressor memory and the compressor memory should maintain the same data at the same locations so that pointers reference the correct locations of the stored data strings. However, if the decompressor memory and compressor memory are not synchronized, then the decompressor may not be able to recreate the original data packet that the compressor compressed because the pointer in the compressed data packet will not point to the correct data string in the decompressor memory.

Accordingly, in some aspects, the present methods and apparatuses may provide an efficient solution, as compared to current solutions, by detecting out-of-synchronization between a compressor and decompressor in a wireless communication network, and to perform a procedure to reset the memories of the compressor and the decompressor to a predetermined state in order to correctly and efficiently compress and decompress data packets.

Figure 1:
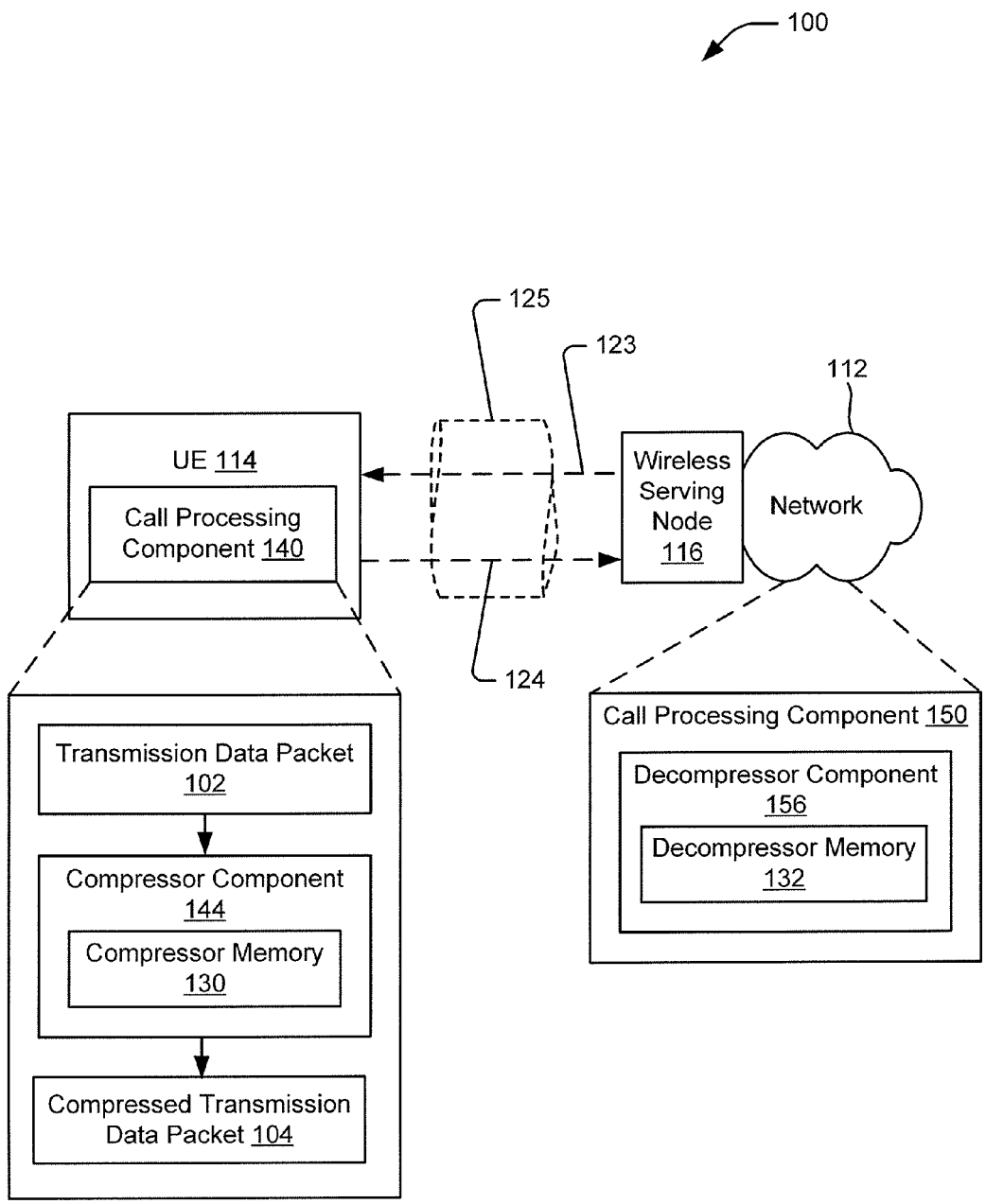
FIG. 1 is a schematic diagram of an example wireless system of aspects of the present disclosure.

Referring to FIG. 1, in one aspect, a wireless communication system 100 is configured to facilitate transmitting vast amount of data from a mobile device to a network at a fast data transfer rate by synchronizing a compressor and a decompressor for data packet compression and decompression. Wireless communication system 100 includes at least one user equipment (UE) 114 that may communicate wirelessly with one or more network 112 via serving nodes, including, but not limited to, wireless serving node 116 over one or more wireless link 125. The one or more wireless link 125, may include, but are not limited to, signaling radio bearers and/or data radio bearers. Wireless serving node 116 may be configured to transmit one or more signals 123 to UE 114 over the one or more wireless link 125, and/or UE 114 may transmit one or more signals 124 to wireless serving node 116. In an aspect, signal 123 and signal 124 may include, but are not limited to, one or more messages, such as transmitting a data from the UE 114 to network 112 via wireless serving node 116.

In an aspect, UE 114 may include a call processing component 140, which may be configured to transmit data to the wireless serving node 116 over wireless link 125. Specifically, in an aspect, call processing component 140 of UE 114 may be configured for receiving a transmission data packet 102, detecting a duplicate string of bytes in the transmission data packet, and replacing the duplicate string of bytes of the transmission data packet with pointer information to generate a compressed data packet 104. Subsequently, call processing component 140 operates to transmit compressed data packet 104, such as in signal 124 sent to wireless serving node 116 and/or network 112 via wireless link 125. Similarly, in an alternative or additional aspect, the above noted functionally of call processing component 140 may be included in network 112, as represented by call processing component 150.

Additionally, the call processing component 140 may also be operable to synchronize compressor memory 130 of compressor component 144 and decompressor memory 132 of decompressor component 156. For example, synchronization component 148 may be operable to determine that compressor memory 130 of a compressor component 144 and decompressor memory 132 of a decompressor component 156 are out-of-synchronization based on a checksum failure. Further, for example, synchronization component 148 may be operable to reset compressor memory 130 and decompressor memory 132 to a predetermined state in response to determining that the compressor memory 130 and decompressor memory 132 are out-of-synchronization. Thus, call processing components 140/150 may synchronize their respective compressor and decompressor in order for compressed data packets to be properly decompressed.

UE 114 may comprise a mobile apparatus and may be referred to as such throughout the present disclosure. Such a mobile apparatus or UE 114 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, or some other suitable terminology.

Additionally, the one or more wireless nodes, including, but not limited to, wireless serving node 116 of wireless communication system 100, may include one or more of any type of network component, such as an access point, including a base station or node B, a relay, a peer-to-peer device, an authentication, authorization and accounting (AAA) server, a mobile switching center (MSC), a radio network controller (RNC), etc. In a further aspect, the one or more wireless serving nodes of wireless communication system 100 may include one or more small base stations, such as, but not limited to a femtocell, picocell, microcell, or any other base station, access point or cell having a substantially smaller transmit power or coverage area than a macro base station or cell.

Figure 2:
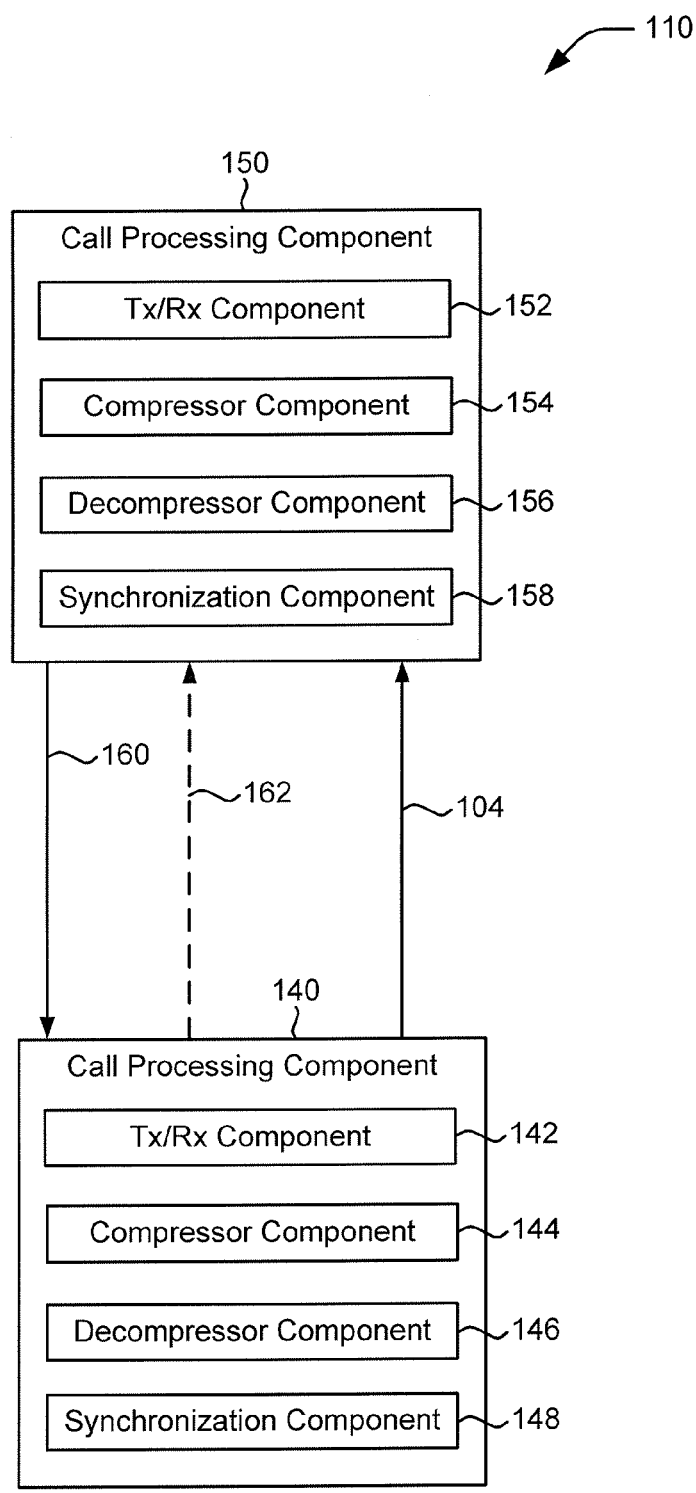
FIG. 2 is a schematic diagram of an aspect of call processing in a wireless communication system.

Referring to FIG. 2, one aspect of call processing component 140 of UE 114, and similarly of call processing component 150 of wireless serving node 116 and/or network 112, may include a number of subcomponents for carrying out the functions described herein.

For example, call processing component 140 may be configured, among other things, to include a TX/RX component 142 configured to transmit and receive transmission data packets. For instance, TX/RX component 142 may be capable of transmitting and/or receiving data to/from network 112 via wireless serving node 116 over link 125, including transmitting compressed transmission data packet 104.

The call processing component 140 may also be configured to include a compressor component 144 capable of reducing a size of transmission data packet, e.g., generating corresponding compressed data packet, such as by pattern encoding and entropy encoding. For example, compressor component 144 may be configured for compressing transmission data packet 102 for transmission to network 112 via wireless serving node 116 over link 125.

The call processing component 140 may also be configured to include a de-compressor component 146 capable of receiving a compressed data packet and re-forming an original, uncompressed data packet, such as by pattern decoding and entropy decoding. For example, de-compressor component 146 may be configured for de-compressing the data received from network 112 via wireless serving node 116 over link 125.

Additionally, the call processing component 140 may also be configured to include a synchronization component 148 operable to synchronize compressor memory 130 of compressor component 144 and decompressor memory 132 of decompressor component 156. For example, synchronization component 148 may be operable to determine that compressor memory 130 of a compressor component 144 and decompressor memory 132 of a decompressor component 156 are out-of-synchronization based on a checksum failure. Further, for example, synchronization component 148 may be operable to reset compressor memory 130 and decompressor memory 132 to a predetermined state in response to determining that the compressor memory 130 and decompressor memory 132 are out-of-synchronization.

In some aspects, call processing component 140 may transmit a compressed transmission data packet 104 to call processing component 150 for decompression by decompressor component 156. However, synchronization component 158 may be operable to determine that decompressor memory 132 is not in synchronization with compressor memory 130 based on a checksum procedure performed on the compressed transmission data packet 104. As a result, synchronization component 158 may be operable to perform a procedure to reset decompressor memory 132 and compressor memory 130 to a predetermined state, e.g., a known state where both are synchronized. For example, synchronization component 158 may configure call processing component 150 to transmit a signal 160 to call processing component 140 as part of the reset procedure. In some instances, signal 160 may be a Radio Link Control (RLC) RESET signal capable of causing the compressor component 144 to flush, e.g., erase or clear, the contents of compressor memory 130. Prior to transmitting signal 160, the contents of decompressor memory 132 may be flushed, e.g., erased or cleared, as well. Call processing component 140 may transmit a signal 162, such as RESET ACK signal, back to call processing component 150 in order to indicate that the contents of compressor memory 130 have been flushed. Accordingly, compressor memory 130 and decompressor memory 132 may be synchronized as a result of flushing their contents, e.g., which may be defined as obtaining a predetermined state. Although illustrated as a separate component, it should be noted that synchronization component 148 may be included within compressor component 144.

Similarly, in an alternative or additional aspect, the above noted functionally of call processing component 140 may be included in wireless serving node 116 and/or network 112, as represented by call processing component 150. For example, but not limited hereto, call processing component 150 may be hardware mounted within wireless serving node 116 and/or network 112, software or computer readable media and/or firmware stored within a memory or processor of wireless serving node 116 and/or network 112, or any combination thereof.

In an aspect, call processing component 150 may be configured to include TX/RX component 152, a compressor component 154, a de-compressor component 156, and a synchronization component 158, respectively having similar capabilities as TX/RX component 142, a compressor component 144, a de-compressor component 146, and a synchronization component 148 of call processing component 140 of UE 114.

Thus, the present apparatus and methods include a UE-based, and/or network based, call processing component capable of determining that a compressor memory of a compressor and a decompressor memory of a decompressor are out-of-synchronization based on a checksum failure, and resetting the compressor memory and the decompressor memory to a predetermined state in response to determining that the compressor memory and the decompressor memory are out-of-synchronization, wherein the compressor memory and the decompressor memory are synchronized at the predetermined state.

Figure 3:
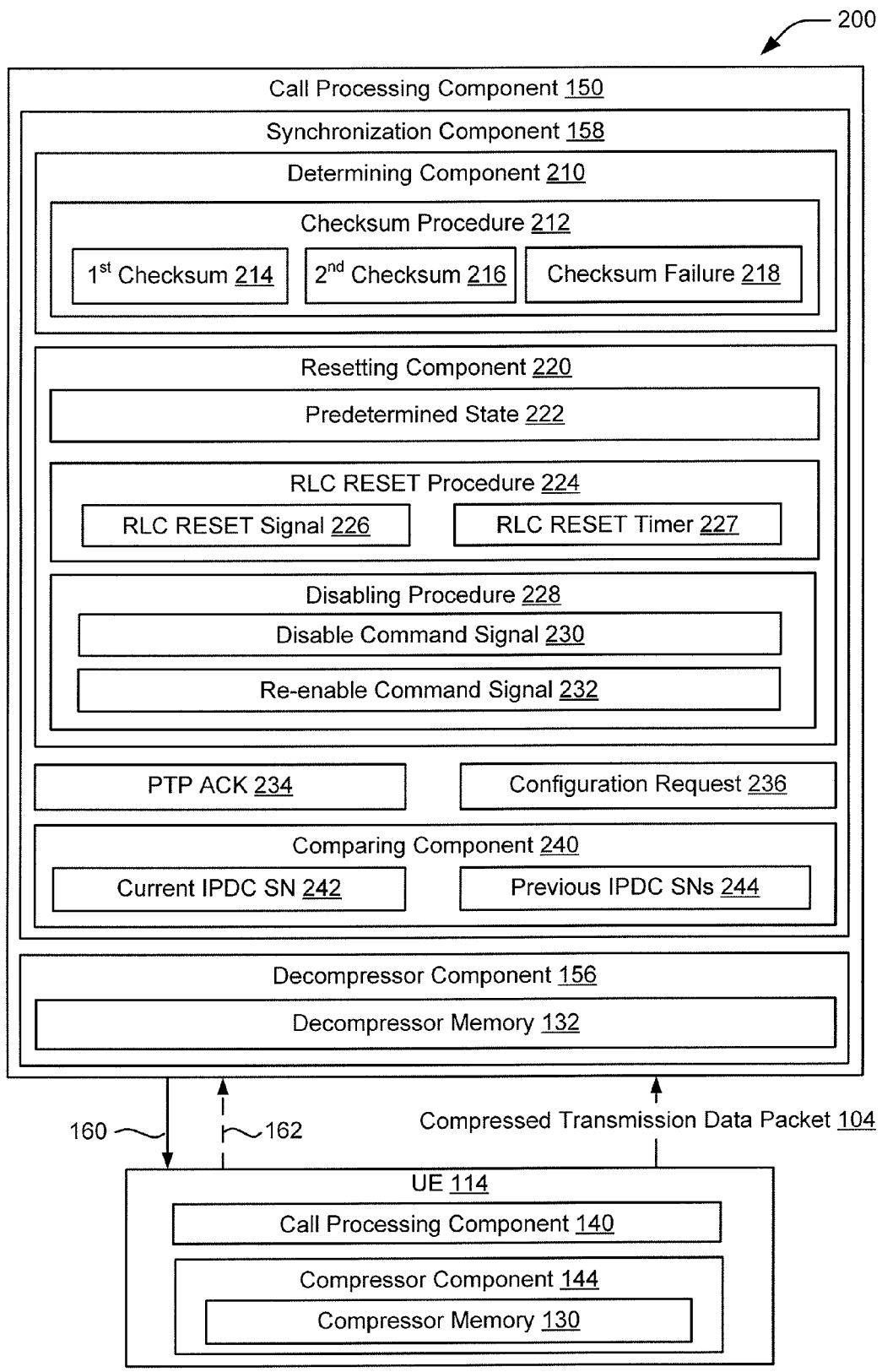
FIG. 3 is a schematic diagram of an aspect of compression and decompression components in a wireless communication system.

FIG. 3 is a schematic diagram 200 of an aspect of the synchronization component 158 and the decompressor component 156, which reside in call processing component 150 of FIG. 2. Generally, call processing component 150 may reside in network 112 (FIG. 1) and may be configured to receive a compressed transmission data packet 104 from UE 114 after being routed through a UE-based compressor component 144. Compressed transmission data packet 104 may include or be carried by signal 123 transmitted from UE 114 to network 112 over wireless link 125.

Specifically, in an aspect, call processing component 150 may include synchronization component 158, which may be configured to determine that compressor memory 130 of compressor component 144 and decompressor memory 132 of decompressor component 156 are out-of-synchronization based on a checksum failure 218. Further, synchronization component 158 may be configured to reset compressor memory 130 and decompressor memory 132 to a predetermined state 222 in response to determining that the compressor memory 130 and the decompressor memory 132 are out-of-synchronization, wherein the compressor memory 130 and the decompressor memory 132 are synchronized at the predetermined state 222.

In an aspect, synchronization component 158 may include determining component 210, which may be configured to determine whether compressor memory 130 and the decompressor memory 132 are out-of-synchronization based on a checksum procedure 212. For example, determining component 210 may implement checksum procedure 212 after decompressor component 156 decompresses compressed transmission data packet 104 received from UE 114 to form a decompressed data packet. The checksum procedure 212 comprises calculating a $1^{st}$ checksum 214 for the decompressed data packet. Then, checksum procedure 212 determines whether the $1^{st}$ checksum 214 for the decompressed data packet matches a $2^{nd}$ checksum 216 for an original data packet 102. In some instances, the original data packet 102 corresponds to an uncompressed version of the compress transmission data packet 104 received from UE 114. Then, checksum procedure 212 indicates a checksum failure 218 if the $1^{st}$ checksum 214 does not match the $2^{nd}$ checksum 216. In other instances, checksum procedure 212 may be configured to indicate to call processing component 150 and/or decompressor component 156 to continue to decompress incoming compressed data packets (e.g., compressed transmission data packet 104) if the $1^{st}$ checksum 214 matches the $2^{nd}$ checksum 216. In an optional instance, the checksum procedure 212 may only calculate the $2^{nd}$ checksum 216 for a limited number of bytes, e.g., only a portion of a total number of bytes, such as a first number of bytes at the beginning and a second number of bytes at the end, of the original data packet, and appended the $2^{nd}$ checksum to a header of the compressed data packet (e.g., compressed transmission data packet 104) prior to transmission of the compressed data packet. Similarly, the checksum procedure 212 may only calculate the $1^{st}$ checksum 214 for a limited number of bytes of the decompressed data packet. In some instances, calculating the $1^{st}$ checksum 214 may comprise calculating the $1^{st}$ checksum 214 for at least one or both of an Internet Protocol (IP) and Transmission Control Protocol (TCP) layer on the decompressed data packet. In these instances the $2^{nd}$ checksum 216 for the original data packet corresponds to the $2^{nd}$ checksum 216 for at least one or both of an Internet Protocol (IP) and Transmission Control Protocol (TCP) layer on original data packet.

Further, in an aspect, synchronization component 158 may include resetting component 220, which may be configured to reset decompressor memory 132 and compressor memory 130 to a predetermined state 222 in response to the determining component 210 determining that compressor memory 130 and the decompressor memory 132 are out-of-synchronization. For example, determining component 210 may indicate to resetting component 220 that a checksum failure 218 has occurred for the most recently received compressed data packet (e.g., compressed transmission data packet 104). As such, resetting component 220 may be configured to execute either a Radio Link Control (RLC) RESET procedure 224 or a disabling procedure 228 in response to the checksum failure 218.

In one aspect, resetting component 220 may be configured to execute RLC RESET procedure 224 comprising flushing compressor memory 130 and the decompressor memory 132 to bring the decompressor component 156 and compressor component 144 (FIG. 2) to a predetermined state 222. For example, RLC RESET procedure 224 may flush decompressor memory 132 to bring the decompressor component 156 to the predetermined state 222. Then, RLC RESET procedure 224 may cause network 112 (FIG. 1) and/or call processing component 150 to transmit a RLC RESET signal 226 (e.g., signal 160) to UE 114 and/or compressor memory 130. In an instance, RLC RESET signal 226 may be configured to cause compressor memory 130 to be flushed so as to bring the compressor component 144 (FIG. 2) to the predetermined state 222. After transmitting the RLC RESET signal 226, call processing component 150 may be configured to drop (e.g., ignore and/or delete) any RLC Packet Data Units (PDUs) (e.g., compressed transmission data packet 104) received. Subsequent to UE 114 flushing compressor memory 130 based on the RLC RESET signal 226, network 112 (FIG. 1) and/or call processing component 150 may receive a RESET ACK signal (e.g., signal 162) from UE 114. The RESET ACK signal (e.g., signal 162) may indicate that UE 114 has finished flushing compressor memory 130, and/or that compressor component 144 (FIG. 2) has returned to the predetermined state 222. Then, decompressor component 156 may be configured to begin using the contents of decompressor memory 132 for any received compressed data packets and/or RLC PDUs. In some instances, once UE 114 and/or call processing component 140 receive the RLC RESET signal 226 (e.g., signal 160), UE 114 may drop (e.g., ignore and/or delete) any compressed data packets (e.g., Service Data Units (SDUs) and/or PDUs), and flush the contents of compressor memory 130. Moreover, after transmitting the RESET ACK (e.g., signal 162), UE 114 and/or compressor component 144 (FIG. 2) may use the contents of compressor memory 130, which have been set to the predetermined state 222 for any future compression operations. As a result, decompressor component 156 is able to continue to decompress the compressed data packets (e.g., compressed transmission data packet 104) since decompressor component 156 and compressor component 144 (FIG. 2) are in synchronization. Additionally, since the already compressed data packets at UE 114 are dropped, call processing component 150 will not receive them. In the instance where Transmission Control Protocol and Internet Protocol (TCP/IP) are used, the dropped compressed data packets may be recovered.

In an optional aspect, RLC RESET procedure 224 may continue even though an RESET ACK signal (e.g., signal 162) is not received from UE 114. RLC RESET procedure 224 may cause network 112 (FIG. 1) and/or call processing component 150 to transmit a RLC RESET signal 226 (e.g., signal 160) to UE 114 and/or compressor memory 130. UE 114 may or may not receive the RLC RESET signal 226 (e.g., signal 160). For example, UE 114 may receive RLC RESET signal 226 (e.g., signal 160), drop any compressed data packets, and flush the contents of compressor memory 130. However, network 112 and/or call processing component 150 may not receive the RESET ACK signal (e.g., signal 162). On the hand, in some instances, UE 114 may not receive RLC RESET signal 226 (e.g., signal 160), and thus, compressor memory 130 will not be flushed. As such, RLC RESET procedure 224 may maintain a RLC RESET timer 227. When the RLC RESET timer 227 expires, RLC RESET procedure 224 may be configured to re-transmit the RLC RESET signal 226 to UE 114. In some instances, RLC RESET procedure 224 may reset RLC RESET timer 227 back to its default state, and restart the RLC RESET timer 227 upon re-transmitting the RLC RESET signal 226. Upon receiving the re-transmitted RLC RESET signal 226, UE 114 and/or call processing component 140 may once again drop any compressed data packets, and flush the contents of compressor memory 130. Once any compress data packets are dropped and the contents of compressor memory 130 are flushed, UE 114 and/or call processing component 140 may transmit a RESET ACK signal to network 112 (FIG. 1) and/or call processing component 150. If call processing component 150 receives the RESET ACK signal then resetting component 220 may indicate to decompressor component 156 that it is now synchronized with compressor component 144. However, if the RESET ACK signal is again not received, and the RLC RESET timer 227 once again expires, resetting component 220 may continue RLC RESET procedure 224 until decompressor component 156 and compressor component 144 (FIG. 2) are synchronized.

In another aspect, when the RLC RESET procedure 224 is performed by UE 114 and/or call processing component 140, network 112 (FIG. 1) and/or call processing component 150 may be configured to drop any compressed data packets in response to receiving an RLC RESET signal 226, and flush the contents of decompressor memory 132. Generally, the entity receiving the RLC RESET signal 226 is configured to drop any compressed data packets and flush the contents of its respective memory (e.g., decompressor memory 132 or compressor memory 130). For example, if UE 114 receives the RLC RESET signal 226, then it is configured to drop all compressed data packets (e.g., SDUs) and flush the content of compressor memory 130. If, for example, network 112 (FIG. 1) and/or call processing component 150 receives RLC RESET signal 226, then it is also configured to drop all compressed data packets (e.g., SDUs) and flush the content of decompressor memory 132. However, if UE 114 and/or call processing component 140 is transmitting the RLC RESET signal 226, then it may be configured to also drop all the compressed data packets (e.g., SDUs) and flush the contents of compressor memory 130 before transmitting the RLC RESET signal 226.

Moreover, in an aspect, resetting component 220 may be configured to execute a disabling procedure 228 in response to the checksum failure 218 comprising enabling and re-enabling decompressor memory 132 and compressor memory 130. For example, disabling procedure 228 may disable the decompressor component 156 in response to the checksum failure 218 indication. In some instances, disabling the decompressor component 156 prevents the decompressor component 156 from decompressing any received compressed data packets (e.g., compressed transmission data packet 104). Then, disabling procedure 228 may configure network 112 (FIG. 1) and call processing component 150 to transmit a disable command signal 230 (e.g., signal 160) to UE 114 and/or compressor component 144. The disable command signal 230 may cause the compressor component 144 to be disabled. In some instances, disabling the compressor component 144 prevents the compressor component 144 from compressing any data packets. Subsequently, disabling procedure 228 may re-enable the decompressor component 156. Re-enabling the decompressor component 156 causes the decompressor component 156 to flush the contents of decompressor memory 132. As such, the decompressor component 156 returns to the predetermined state 222. Further, disabling procedure 228 may configure network 112 (FIG. 1) and call processing component 150 to transmit a re-enable command signal 232 (e.g., signal 160) to UE 114 and/or compressor component 144. The re-enable command signal 232 may cause the compressor component 144 to re-enable compression for one or more data packets. Re-enabling the compressor component 144 causes the compressor component 144 to flush the contents of compressor memory 130, and return the compressor component 144 to the predetermined state 222. In some instances, if a partial data packet is dropped at the compressor component 144 before it becomes compressed (e.g., reaches the compression algorithm) then the compressor component 144 and the decompressor component 156 may be in synchronization, but the checksum procedure 212 will fail due to the $1^{st}$ checksum 214 and the $2^{nd}$ checksum 216 not matching. In these instances, a checksum procedure 212 needs to be performed on the partial data packet, and an RLC RESET procedure 224 needs to be initiated in order to synchronize the compressor component 144 and the decompressor component 156. For example, the RLC RESET signal (e.g., signal 160) further causes the compressor component 144 to flush the compressor memory 130 to obtain the predetermined state 222 further comprises flushing one or more compressed RLC Service Data Units (SDUs).

In a further aspect, synchronization component 158 may transmit a configuration request 236, which may be configured to cause UE 114 to enable uplink compression for transmitted data packets. As such, UE 114 may transmit a point-to-point acknowledgement (PTP ACK) signal 234 in response to receiving the configuration request 236 and enabling uplink compression. However, in certain instances, PTP ACK signal 234 may not be received from UE 114, and therefore, an RLC RESET procedure 224 may be triggered in response. As a result, resetting component 220 may perform RLC RESET procedure 224, and thereby, synchronize decompressor component 156 and compressor component 144. Moreover, in response to the synchronization and after transmitting the RESET ACK signal, UE 114 and/or call processing component 140 may be configured to re-transmit the PTP ACK 234 signal in order to begin uplink compression as per the previously received configuration request 236.

In some aspects, compression may not be automatically enabled after an RLC RESET procedure 224 is successfully performed. In these instances, after the RLC RESET procedure 224 the decompressor component 156 and the compressor component 144 may be set by default to a disable state. As a result, data packets transmitted between the call processing components 140 and 150 are uncompressed. As such, call processing component 150 may transmit a configuration request 236 after the RLC RESET procedure 224 is successfully performed (e.g., after the call processing component 150 receives a RESET ACK signal). The configuration request 236 may enable UE 114 and/or call processing component 140 to enable compression at compressor component 144. Upon receiving the configuration request 236, UE 114 and/or call processing component 140 may enable compression and transmit a PTP ACK 234 signal to call processing component 150 in response to doing so. Once call processing component 150 receives the PTP ACK 234 signal it may re-enable compression. In some instances, call processing component 150 may enable compression before or upon transmitting the configuration request 236.

In a further aspect, synchronization component 158 may include comparing component 240, which may be configured to determine whether an Internet Protocol Data Compression (IPDC) sequence number (SN) of a compressed data packet (e.g., compressed transmission data packet 104) matches one or more IPDC SNs corresponding to previously received compressed data packets prior to an RLC RESET procedure 224 being successfully performed. An IPDC SN is a SN on the IPDC layer. In some instances, once the IPDC layer compresses a data packet, compressor component 144 may add a SN at the head of the compressed data packet and transmit it to the RLC layer. These compressed data packets may be stored as RLC SDUs in the RLC layer. As such, the RLC layer may turn the RLC SDUs in to RLC PDUs and transmit them to network 112 (FIG. 1) and/or call processing component 150. For example, network 112 (FIG. 1) and/or call processing component 150 may receive a compressed data packet (e.g., compressed transmission data packet 104) comprising a current IPDC SN 242. In some instances, comparing component 240 may then compare the current IPDC SN 242 with previous IPDC SNs 244 to determine whether the current IPDC SN 242 is the correct (expected) IPDC SN. If the current IPDC SN 242 is the correct (expected) IPDC SN, then comparing component 240 may indicate to decompressor component 156 to decompress the compressed data packet (e.g., compressed transmission data packet 104), and update the contents of decompressor memory 132. However, if the current IPDC SN 242 is not the correct (expected) IPDC SN, then comparing component 240 may determine whether the current IPDC SN 242 is a duplicate of previous IPDC SNs 244 or if there is a hole between the current IPDC SN 242 and the previous IPDC SNs 244. In some instances, comparing component 240 may determine that the current IPDC SN 242 is a duplicate of previous IPDC SNs 244 by comparing the value of the SNs to determine if current IPDC SN 242 is less than one or more of the most recently received previous IPDC SNs 244. Moreover, comparing component 240 may determine that there is a hole between the current IPDC SN 242 and the previous IPDC SNs 244 by comparing the value of the SNs to determine if there is a gap between the current IPDC SN 242 and the previous IPDC SNs 244. If the current IPDC SN 242 is a duplicate of previous IPDC SNs 244, then comparing component 240 may configure call processing component 150 to drop the compressed data packet (e.g., compressed transmission data packet 104) corresponding to the current IPDC SN 242. If there is a hole between the current IPDC SN 242 and the previous IPDC SNs 244, then comparing component 240 may configure call processing component 150 to abort decompression on the compressed data packet (e.g., compressed transmission data packet 104) corresponding to the current IPDC SN 242 and transmit a signal to UE 114 to stop uplink compression at compressor component 144.

In another aspect, decompressor component 156, located within call processing component 150, may be configured to receive a compressed transmission data packet (via TX/RX component 152 in FIG. 2), such as compressed data packet 104 formed by one of the operations described above, and decompress the compressed transmission data packet to form a decompressed transmission data packet.

Figure 4A:
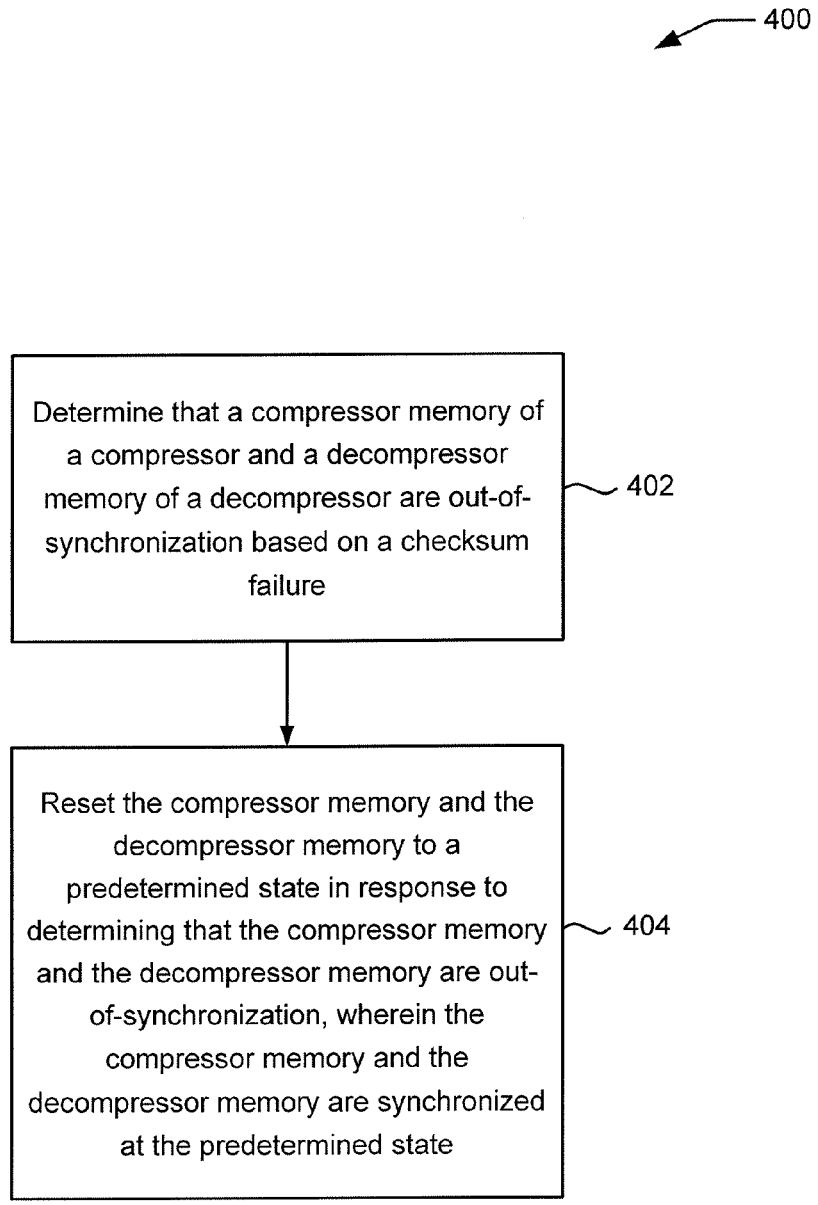
FIGS. 4A and 4B are flow diagrams of methods of an aspect for call processing in a wireless communication system.
Figure 4B:
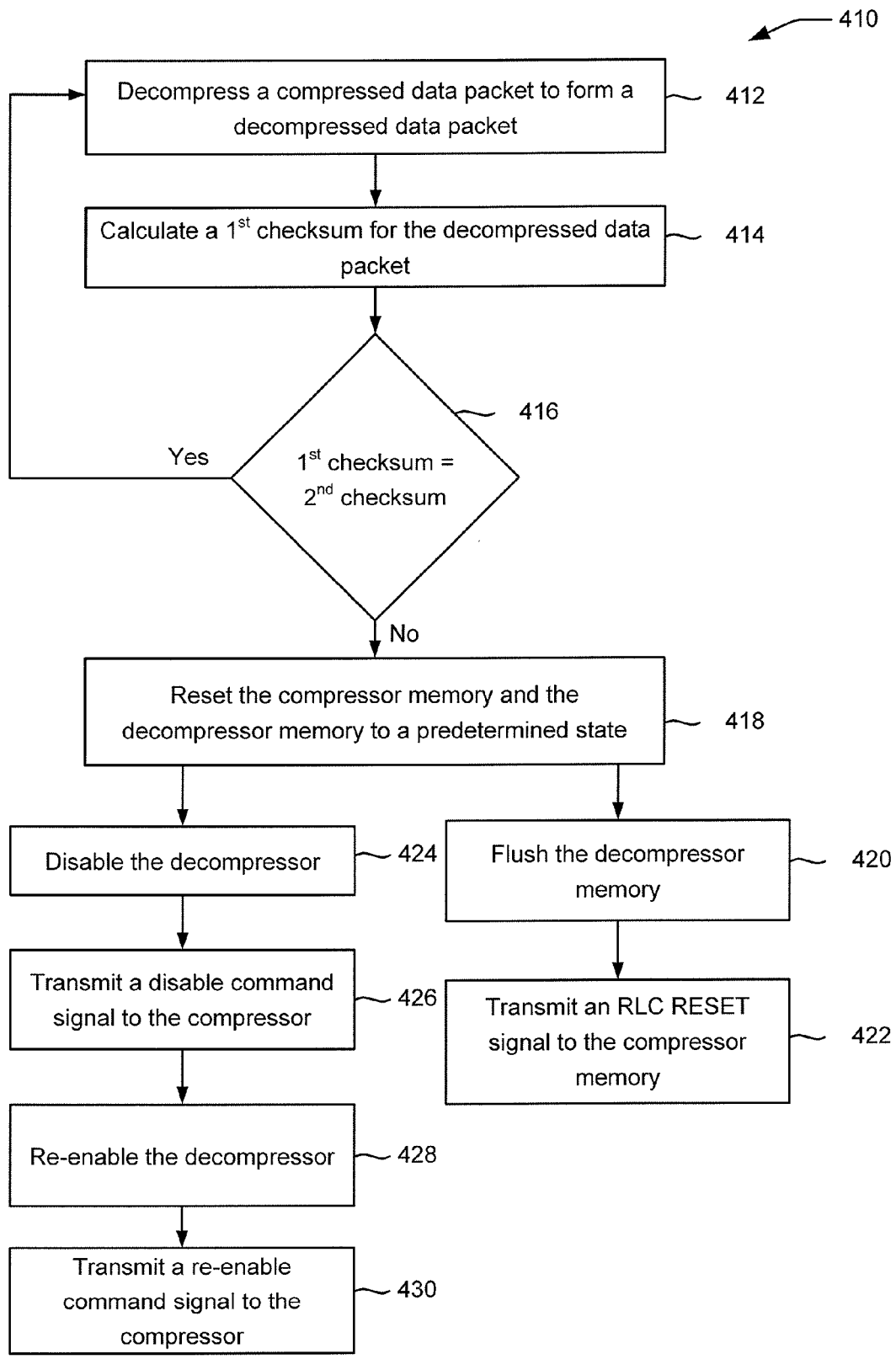

Referring to FIGS. 4A and 4B, in operation, a UE such as UE 114 (FIG. 2), or a network such as network 112 (FIG. 2) may perform one aspect of a methods 400/410 for detecting out-of-synchronization between compressor component 144 (FIG. 2) and decompressor component 156 (FIG. 2), and correcting the synchronization issue. While, for purposes of simplicity of explanation, the methods herein are shown and described as a series of acts, it is to be understood and appreciated that the methods are not limited by the order of acts, as some acts may, in accordance with one or more aspects, occur in different orders and/or concurrently with other acts from that shown and described herein. For example, it is to be appreciated that the methods could alternatively be represented as a series of interrelated states or events, such as in a state diagram. Moreover, not all illustrated acts may be required to implement a method in accordance with one or more features described herein.

Referring to FIG. 4A, in an aspect, at block 402, method 400 includes determining that a compressor memory of a compressor and a decompressor memory of a decompressor are out-of-synchronization based on a checksum failure. For example, as described herein, synchronization component 158 (FIG. 3) may execute determining component 210 to determine that compressor memory 130 of compressor component 144 and decompressor memory 132 of decompressor component 156 are out-of-synchronization based on a checksum failure 218.

At block 404, method 400 includes resetting the compressor memory and the decompressor memory to a predetermined state in response to determining that the compressor memory and the decompressor memory are out-of-synchronization, wherein the compressor memory and the decompressor memory are synchronized at the predetermined state. For example, as described herein, synchronization component 158 (FIG. 3) may execute resetting component 220 (FIG. 3) to reset the compressor memory 130 and the decompressor memory 132 to a predetermined state, e.g., a synchronization state, in response to determining that the compressor memory 130 and the decompressor memory (132 are out-of-synchronization, wherein the compressor memory 130 and the decompressor memory 132 are synchronized at the predetermined state 222. In some instances, resetting component 220 may be configured to execute either a Radio Link Control (RLC) RESET procedure 224 or a disabling procedure 228 in response to the checksum failure 218.

Referring to FIG. 4B, a more detailed aspect of method 400 (FIG. 5A) is described. At block 412, method 410 includes decompressing a compressed data packet to form a decompressed data packet. For example, as described herein, call processing component 150 may execute decompressor component 156 (FIG. 3) to decompress a compressed data packet (e.g., compressed transmission data packet 104) to form a decompressed data packet.

At block 414, method 410 includes calculating a $1^{st}$ checksum for the decompressed data packet. For example, as described herein, synchronization component 158 may execute determining component 210 (FIG. 3) to calculate a $1^{st}$ checksum 214 for the decompressed data packet.

Further, at block 416, method 410 includes determining whether the 1$^{st}$ checksum for the decompressed data packet matches the 2$^{nd}$ checksum for an original data packet. For example, as described herein, synchronization component 158 may execute determining component 210 (FIG. 3) to determine whether the 1$^{st}$ checksum 214 for the decompressed data packet matches the 2$^{nd}$ checksum 216 for an original data packet. In some instances, the original data packet corresponds to an uncompressed version of the compressed data packet (e.g., compressed transmission data packet 104). In an instance where the 1$^{st}$ checksum 214 does not match the 2$^{nd}$ checksum 216, method 410 may proceed to block 418. If the 1$^{st}$ checksum 214 matches the 2$^{nd}$ checksum 216 then method 410 returns to block 412.

At block 418, method 410 includes resetting the compressor memory and the decompressor memory to a predetermined state. For example, as described herein, synchronization component 158 may execute resetting component 220 (FIG. 3) to reset the compressor memory 130 and the decompressor memory 132 to a predetermined state 222. In some instances, resetting component 220 may be configured to execute either a Radio Link Control (RLC) RESET procedure 224 (proceed to block 420) or a disabling procedure 228 (proceed to block 424) in response to the checksum failure 218.

In an aspect, at block 420, method 410 includes flushing the decompressor memory. For example, as described herein, call processing component 150 may execute decompressor component 156 (FIG. 3) to flush the decompressor memory 132 to bring the decompressor to the predetermined state 222.

Further, at block 422, method 410 includes transmitting an RLC RESET signal to the compressor memory. For example, as described herein, synchronization component 158 may execute resetting component 220 (FIG. 3) to transmit an RLC RESET signal 226 to the compressor memory 130. In some instances, the RLC RESET signal 226 may cause the compressor component 144 to flush the compressor memory 130 to bring the compressor component 144 to the predetermined state 222.

On the other hand, if block 418 proceeds to block 424, method 410 includes disable the decompressor. For example, as described herein, synchronization component 158 may execute resetting component 220 (FIG. 3) to disable the decompressor component 156 in response to the determining component 210 determining that the compressor memory 130 and the decompressor memory 132 are out-of-synchronization.

At block 426, method 410 includes transmitting a disable command signal to the compressor. For example, as described herein, synchronization component 158 may execute resetting component 220 (FIG. 3) to transmit a disable command signal 230 to the compressor component 144. In an instance, the disable command signal 230 disables the compressor component 144 from compressing one or more data packets.

Further, at block 428, method 410 includes re-enabling the decompressor. For example, as described herein, synchronization component 158 may execute resetting component 220 (FIG. 3) to re-enable the decompressor component 156. In some instances, re-enabling the decompressor component 156 causes the decompressor component 156 to flush the contents of decompressor memory 132 to the predetermined state 222.

Moreover, at block 430, method 410 includes transmitting a re-enable command signal to the compressor. For example, as described herein, synchronization component 158 may execute resetting component 220 (FIG. 3) to transmit a re-enable command signal 232 to the compressor component 144. In some instances, the re-enable command signal 232 enables the compressor component 144 to compress the one or more data packets after causing the compressor component 144 to flush the contents of compressor memory 130 to bring the compressor component 144 to a predetermined state 222.

Figure 5:
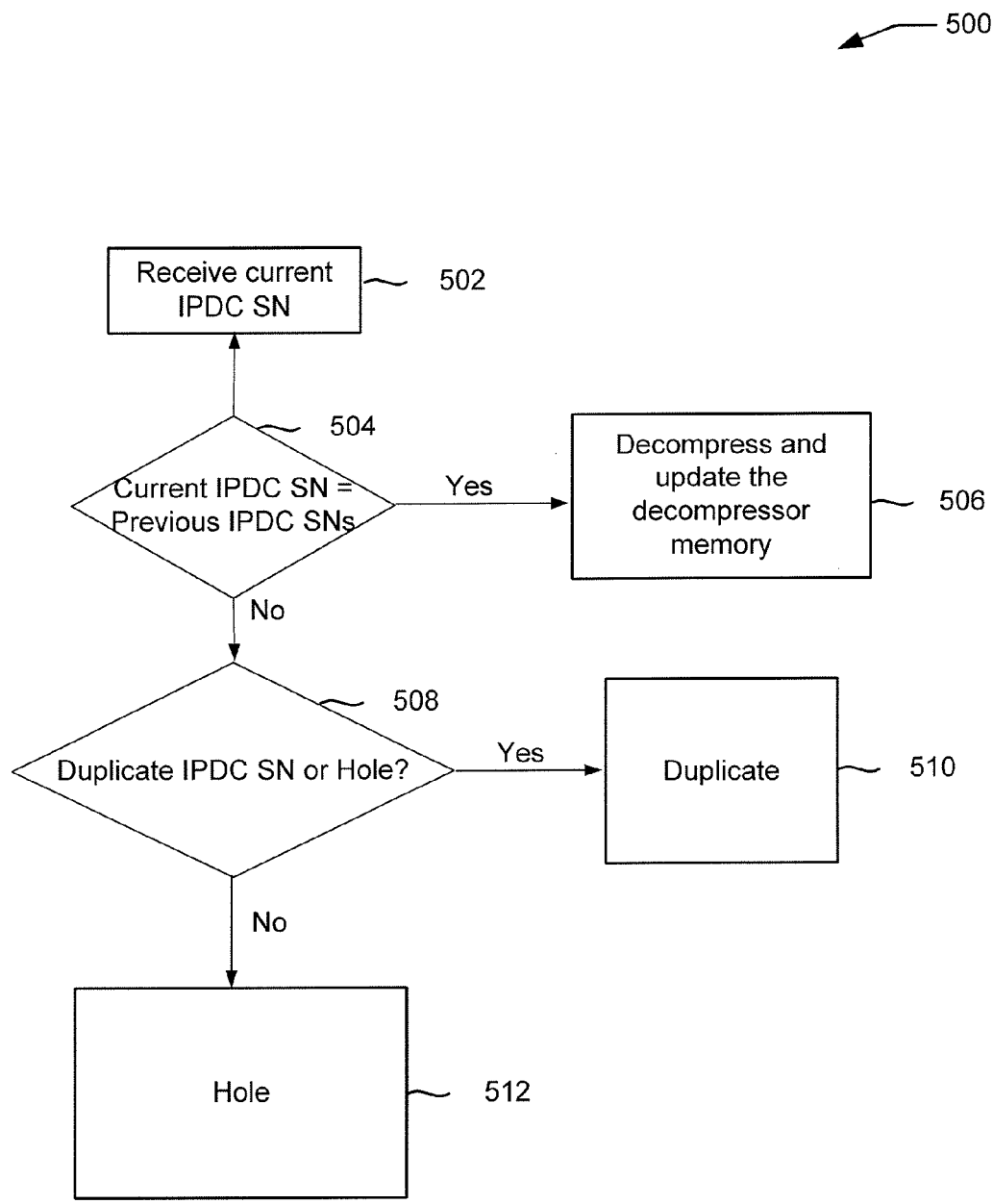
FIG. 5 is a flow diagram of another method of an aspect for call processing in a wireless communication system.

Referring to FIG. 5, in operation, a UE such as UE 114 (FIG. 2), or a network such as network 112 (FIG. 2) may perform one aspect of a method 500 for determining whether an IPDC SN of a compressed data packet (e.g., compressed transmission data packet 104) matches one or more IPDC SNs corresponding to previously received compressed data packets prior to an RLC RESET procedure 224 being successfully performed. While, for purposes of simplicity of explanation, the method herein is shown and described as a series of acts, it is to be understood and appreciated that the method is not limited by the order of acts, as some acts may, in accordance with one or more aspects, occur in different orders and/or concurrently with other acts from that shown and described herein. For example, it is to be appreciated that the method could alternatively be represented as a series of interrelated states or events, such as in a state diagram. Moreover, not all illustrated acts may be required to implement a method in accordance with one or more features described herein.

At block 502, method 500 may include receiving an IPDC packet at part of a compressed data packet at the decompressor. For example, as described herein, call processing component 150 may execute decompressor component 156 (FIG. 3) to receive a current IPDC packet (SN) 242 as part of a compressed data packet. In some instances, network 112 (FIG. 1) and/or call processing component 150 may receive a compressed data packet (e.g., compressed transmission data packet 104) comprising a current IPDC SN 242.

In another aspect, at block 504, method 500 may include comparing the current IPDC SN with previous IPDC SNs. For example, as described herein, synchronization component 158 may execute comparing component 240 (FIG. 3) to compare the current IPDC SN 242 with previous IPDC SNs 244 to determine whether the current IPDC SN 242 is the correct (expected) IPDC SN. If the current IPDC SN 242 is the correct (expected) IPDC SN, then method 500 proceeds to block 506.

At block 506, method 500 may include decompressing the compressed data packet and update the decompressor memory. For example, as described herein, call processing component 150 may execute decompressor component 156 (FIG. 3) to decompress the compressed data packet (e.g., compressed transmission data packet 104), and update the contents of compressor memory 130.

However, if the current IPDC SN 242 is not the correct (expected) IPDC SN, then method 500 proceeds to block 508. At block 508, method 500 may include determining whether the current IPDC SN is a duplicate of previous IPDC SNs or if there is a hole between the current IPDC SN and the previous IPDC SNs. For example, as described herein, synchronization component 158 may execute comparing component 240 (FIG. 3) to determine whether the current IPDC SN 242 is a duplicate of previous IPDC SNs 244 or if there is a hole between the current IPDC SN 242 and the previous IPDC SNs 244. In some instances, comparing component 240 may determine that the current IPDC SN 242 is a duplicate of previous IPDC SNs 244 by comparing the value of the SNs to determine if current IPDC SN 242 is less than one or more of the most recently received previous IPDC SNs 244. Moreover, comparing component 240 may determine that there is a hole between the current IPDC SN 242 and the previous IPDC SNs 244 by comparing the value of the SNs to determine if there is a gap between the current IPDC SN 242 and the previous IPDC SNs 244. If the current IPDC SN 242 is a duplicate of previous IPDC SNs 244, then method 500 proceeds to block 510.

At block 510, method 500 may include dropping the compressed data packet. For example, as described herein, call processing component 150 may execute decompressor component 156 (FIG. 3) to drop the compressed data packet (e.g., compressed transmission data packet 104) corresponding to the current IPDC SN 242.

However, if there is a hole between the current IPDC SN 242 and the previous IPDC SNs 244, then method 500 may proceed to block 512. At block 512, method 500 may include aborting decompression on the compressed data packet. For example, as described herein, call processing component 150 may execute decompressor component 156 (FIG. 3) to abort decompression on the compressed data packet (e.g., compressed transmission data packet 104) corresponding to the current IPDC SN 242 and transmit a signal to UE 114 to stop uplink compression at compressor component 144.

Figure 6:
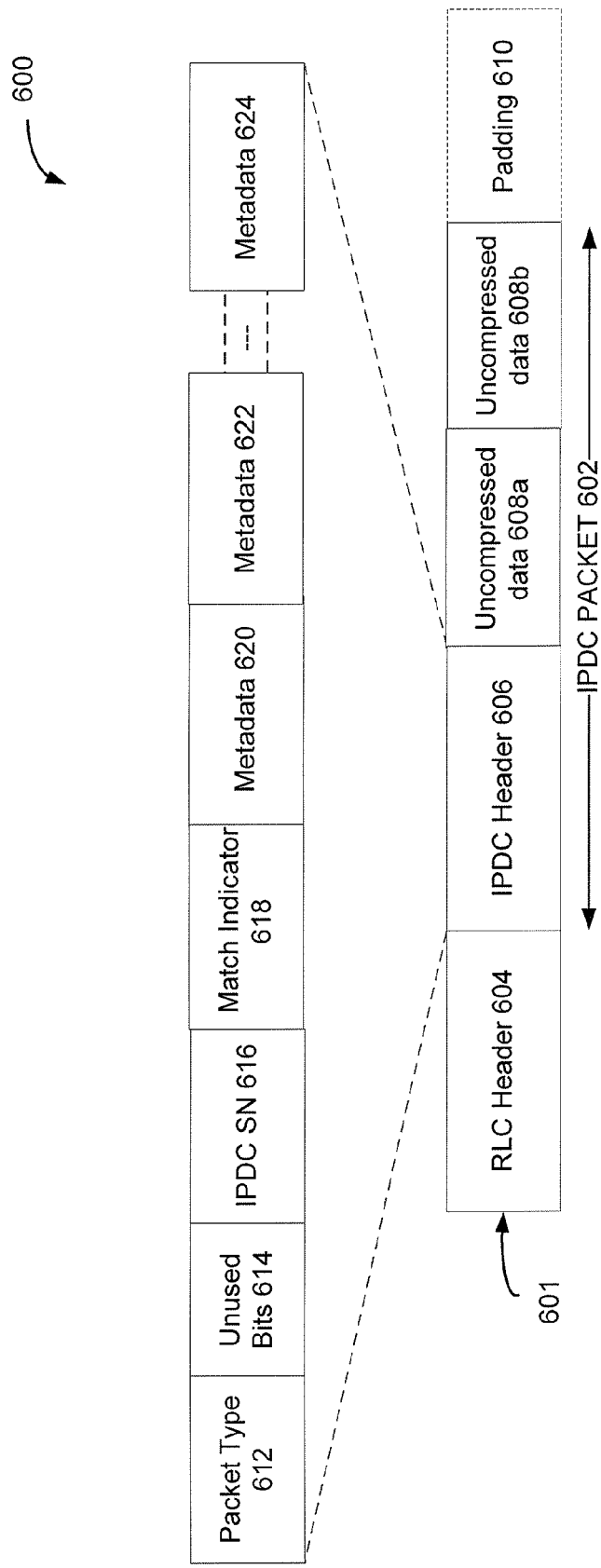
FIG. 6 is a conceptual diagram of an aspect of a data packet according to the present disclosure.

FIG. 6 is a conceptual diagram 600 illustrating a compressed data packet 601 (e.g., similar to compressed transmission data packet 104 in FIG. 3) modified with an IPDC SN (e.g., current IPDC SN 242 in FIG. 3). For example, conceptual diagram 600 illustrates a compressed data packet 601 comprising an IPDC packet 602, an RLC header 604, and optionally padding 610. In some instances, IPDC packet 602 comprises IPDC header 606 along with uncompressed data 608a and 608b. Uncompressed data 608a and 608b correspond to the literal bytes of the original data packet that were not compressed, but copied in to the compressed data packet 601.

Furthermore, IPDC header 606 may comprise packet type 612, unused bits 614, IPDC SN 616, match indicator 618, and metadata 620, 622, and 624. In some instances, packet type 612 may correspond with the specific type of transmission protocol that the data packet is being transmitted on (e.g., TCP/IP, IPV4, IPV6, etc.). Unused bits 614 are bits within IPDC header 606 that remain unused. IPDC SN 616, corresponding to IPDC SN 242 in FIG. 3, may be appended to the compressed data packet 601 in order to ensure that duplicate data packets are not received and decompressed by decompressor component 156 (FIG. 3). Match indicator 618 corresponds to the number of pointers (e.g., metadata) within IPDC header 606. Metadata 620, 622, and 624 refer to pointer information corresponding to locations within a compressor memory (e.g., compressor memory 130) in which the literal bytes that the metadata point to are stored.

Figure 7:
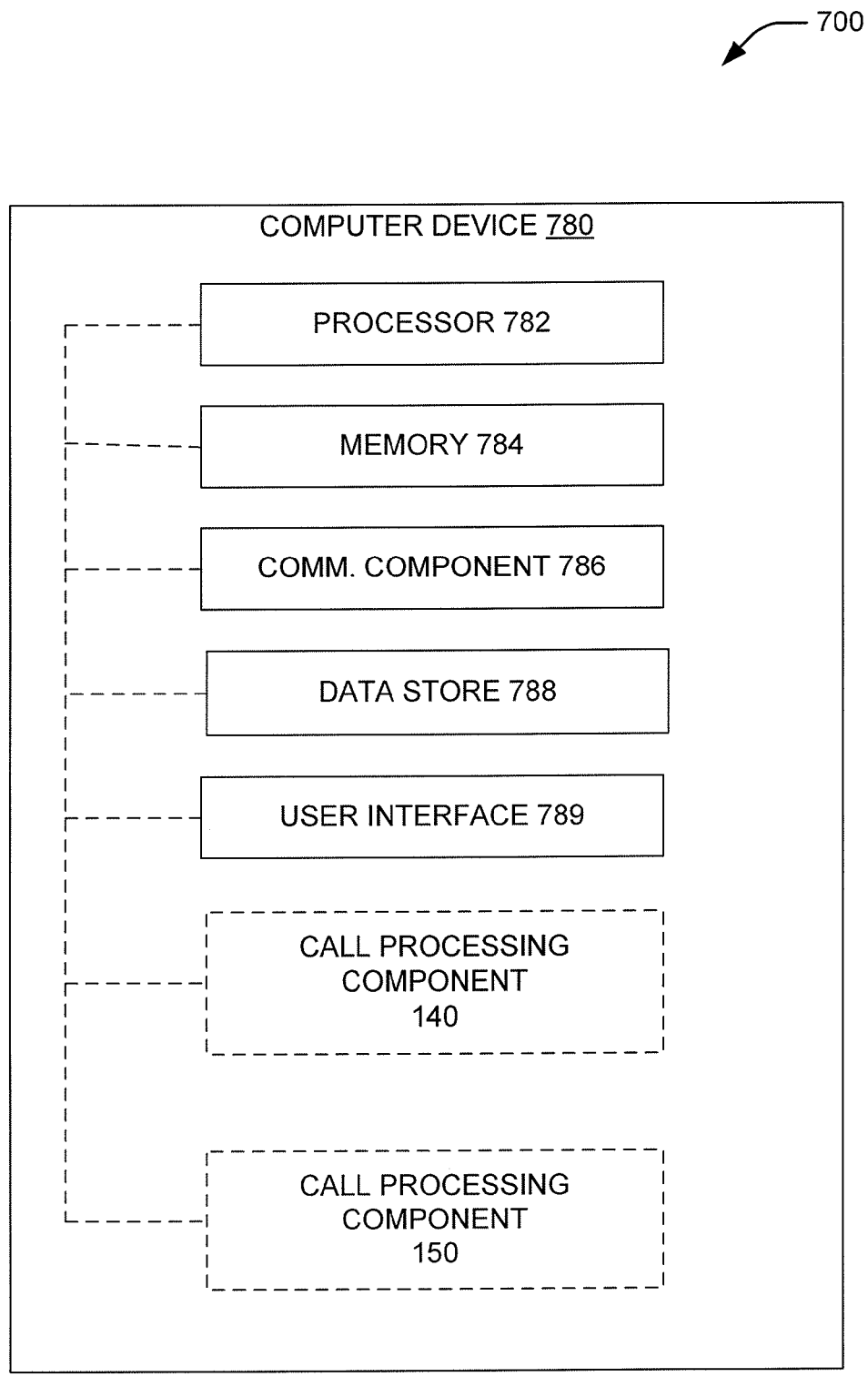
FIG. 7 is a block diagram of an additional example components of an aspect of a computer device having a call processing component according to the present disclosure.

Referring to FIG. 7, in one aspect, UE 114 and/or wireless serving node 116 of FIGS. 1 and/or 2 may be represented by a specially programmed or configured computer device 780 of wireless communication system 100, wherein the special programming or configuration includes call processing component 140 or, alternatively, call processing component 150, as described herein. For example, for implementation as UE 114 (FIG. 2), computer device 780 may include call processing component 140 for compressing a reordered header and transmitting the data from a UE 114 to network 112 via wireless serving node 116. Further for example, computer device 780 at wireless serving node 116 (FIG. 1) and/or network 112 may include call processing component 150 for compressing a reordered header and transmitting the data from wireless serving node 116 and/or network 112 to UE 114. Call processing components 140 and 150 may be specially programmed computer readable instructions or code, firmware, hardware, or some combination thereof.

Call processing components 140/150 may be implemented by processor 782 operating in conjunction with memory 784, communication component 786, data store 788, and user interface 789. Computer device 780 includes a processor 782 for carrying out processing functions associated with one or more of components and functions described herein. Processor 782 can include a single or multiple set of processors or multi-core processors. Moreover, processor 782 can be implemented as an integrated processing system and/or a distributed processing system.

Computer device 780 further includes a memory 784, such as for storing data used herein and/or local versions of applications being executed by processor 782. Memory 784 can include any type of memory usable by a computer, such as random access memory (RAM), read only memory (ROM), tapes, magnetic discs, optical discs, volatile memory, non-volatile memory, and any combination thereof.

Further, computer device 780 includes a communications component 786 that provides for establishing and maintaining communications with one or more parties utilizing hardware, software, and services as described herein. Further, Tx/Rx components 152/142 (FIG. 2) may be implemented by communication component 786 for transmitting and/or receiving data to/from network 112 via wireless serving node 116 over link 125. Communications component 786 may carry communications between components on computer device 780, as well as between computer device 780 and external devices, such as devices located across a communications network and/or devices serially or locally connected to computer device 780. For example, communications component 786 may include one or more buses, and may further include transmit chain components and receive chain components associated with a transmitter and receiver, respectively, or a transceiver, operable for interfacing with external devices. For example, in an aspect, a receiver of communications component 786 operates to receive one or more data via a wireless serving node 116, which may be a part of memory 784.

Additionally, computer device 780 may further include a data store 788, which can be any suitable combination of hardware and/or software, that provides for mass storage of information, databases, and programs employed in connection with aspects described herein. For example, data store 788 may be a data repository for applications not currently being executed by processor 782.

Computer device 780 may additionally include a user interface component 789 operable to receive inputs from a user of computer device 780, and further operable to generate outputs for presentation to the user. User interface component 789 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, user interface component 789 may include one or more output devices, including but not limited to a display, a speaker, a haptic feedback mechanism, a printer, any other mechanism capable of presenting an output to a user, or any combination thereof.

Furthermore, computer device 780 may include, or may be in communication with, call processing component 140/150, which may be configured to perform the functions described herein.

Figure 8:
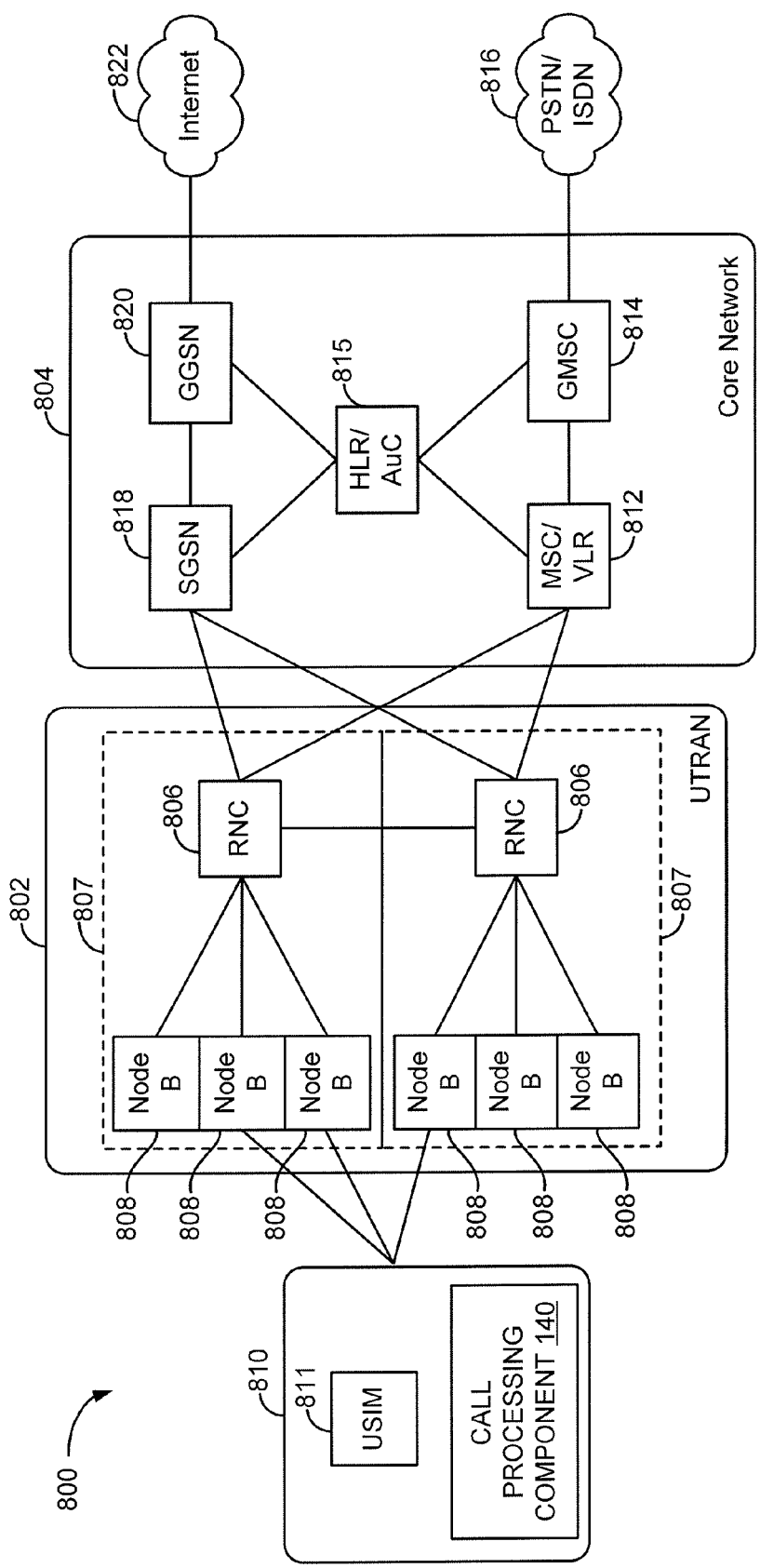
FIG. 8 is a block diagram of an example of a telecommunications system including a UE configured to perform the functions described herein.

Referring to FIG. 8, by way of example and without limitation, the aspects of the present disclosure are presented with reference to a UMTS system 800 employing a W-CDMA air interface. A UMTS network includes three interacting domains: a Core Network (CN) 804, a UMTS Terrestrial Radio Access Network (UTRAN) 802, and User Equipment (UE) 810. UE 810 may be configured to include, for example, the call processing component 140/150 (FIG. 2) implementing the components described above, such as, but not limited to Tx/Rx component 142/152, compressor component 144/154, and de-compressor component 146/156, as described above. In this example, the UTRAN 802 provides various wireless services including telephony, video, data, messaging, broadcasts, and/or other services. The UTRAN 802 may include a plurality of Radio Network Subsystems (RNSs) such as an RNS 807, each controlled by a respective Radio Network Controller (RNC) such as an RNC 806. Here, the UTRAN 802 may include any number of RNCs 806 and RNSs 807 in addition to the RNCs 806 and RNSs 807 illustrated herein. The RNC 806 is an apparatus responsible for, among other things, assigning, reconfiguring and releasing radio resources within the RNS 807. The RNC 806 may be interconnected to other RNCs (not shown) in the UTRAN 802 through various types of interfaces such as a direct physical connection, a virtual network, or the like, using any suitable transport network.

Communication between a UE 810 and a Node B 808 may be considered as including a physical (PHY) layer and a medium access control (MAC) layer. Further, communication between a UE 810 and an RNC 806 by way of a respective Node B 808 may be considered as including a radio resource control (RRC) layer. In the instant specification, the PHY layer may be considered layer 1; the MAC layer may be considered layer 2; and the RRC layer may be considered layer 3.

The geographic region covered by the RNS 807 may be divided into a number of cells, with a radio transceiver apparatus serving each cell. A radio transceiver apparatus is commonly referred to as a Node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, three Node Bs 808 are shown in each RNS 807; however, the RNSs 807 may include any number of wireless Node Bs. The Node Bs 808 provide wireless access points to a CN 804 for any number of mobile apparatuses. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, a tablet, a wearable computing device (e.g., a smartwatch, a health or fitness tracker, etc.), an appliance, a sensor, a vending machine, or any other similar functioning device. The UE 810 is commonly referred to as a UE in UMTS applications, but may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, or some other suitable terminology. In a UMTS system, the UE 810 may further include a universal subscriber identity module (USIM) 811, which contains a user's subscription information to a network. For illustrative purposes, one UE 810 is shown in communication with a number of the Node Bs 808. The DL, also called the forward link, refers to the communication link from a Node B 808 to a UE 810, and the UL, also called the reverse link, refers to the communication link from a UE 810 to a Node B 808.

The CN 804 interfaces with one or more access networks, such as the UTRAN 802. As shown, the CN 804 is a GSM core network. However, as those skilled in the art will recognize, the various concepts presented throughout this disclosure may be implemented in a RAN, or other suitable access network, to provide UEs with access to types of CNs other than GSM networks.

The CN 804 includes a circuit-switched (CS) domain and a packet-switched (PS) domain. Some of the circuit-switched elements are a Mobile services Switching Centre (MSC), a Visitor location register (VLR) and a Gateway MSC. Packet-switched elements include a Serving GPRS Support Node (SGSN) and a Gateway GPRS Support Node (GGSN). Some network elements, like EIR, HLR, VLR and AuC may be shared by both of the circuit-switched and packet-switched domains. In the illustrated example, the CN 804 supports circuit-switched services with a MSC 812 and a GMSC 814. In some applications, the GMSC 814 may be referred to as a media gateway (MGW). One or more RNCs, such as the RNC 806, may be connected to the MSC 812. The MSC 812 is an apparatus that controls call setup, call routing, and UE mobility functions. The MSC 812 also includes a VLR that contains subscriber-related information for the duration that a UE is in the coverage area of the MSC 812. The GMSC 814 provides a gateway through the MSC 812 for the UE to access a circuit-switched network 816. The GMSC 814 includes a home location register (HLR) 815 containing subscriber data, such as the data reflecting the details of the services to which a particular user has subscribed. The HLR is also associated with an authentication center (AuC) that contains subscriber-specific authentication data. When a call is received for a particular UE, the GMSC 814 queries the HLR 815 to determine the UE's location and forwards the call to the particular MSC serving that location.

The CN 804 also supports packet-data services with a serving GPRS support node (SGSN) 818 and a gateway GPRS support node (GGSN) 820. GPRS, which stands for General Packet Radio Service, is designed to provide packet-data services at speeds higher than those available with standard circuit-switched data services. The GGSN 820 provides a connection for the UTRAN 802 to a packet-based network 822. The packet-based network 822 may be the Internet, a private data network, or some other suitable packet-based network. The primary function of the GGSN 820 is to provide the UEs 810 with packet-based network connectivity. Data packets may be transferred between the GGSN 820 and the UEs 810 through the SGSN 818, which performs primarily the same functions in the packet-based domain as the MSC 812 performs in the circuit-switched domain.

An air interface for UMTS may utilize a spread spectrum Direct-Sequence Code Division Multiple Access (DS-CDMA) system. The spread spectrum DS-CDMA spreads user data through multiplication by a sequence of pseudo-random bits called chips. The "wideband" W-CDMA air interface for UMTS is based on such direct sequence spread spectrum technology and additionally calls for a frequency division duplexing (FDD). FDD uses a different carrier frequency for the UL and DL between a Node B 808 and a UE 810. Another air interface for UMTS that utilizes DS- CDMA, and uses time division duplexing (TDD), is the TD-SCDMA air interface. Those skilled in the art will recognize that although various examples described herein may refer to a W-CDMA air interface, the underlying principles may be equally applicable to a TD-SCDMA air interface.

An HSPA air interface includes a series of enhancements to the 3G/W-CDMA air interface, facilitating greater throughput and reduced latency. Among other modifications over prior releases, HSPA utilizes hybrid automatic repeat request (HARQ), shared channel transmission, and adaptive modulation and coding. The standards that define HSPA include HSDPA (high speed downlink packet access) and HSUPA (high speed uplink packet access, also referred to as enhanced uplink, or EUL).

HSDPA utilizes as its transport channel the high-speed downlink shared channel (HS-DSCH). The HS-DSCH is implemented by three physical channels: the high-speed physical downlink shared channel (HS-PDSCH), the high-speed shared control channel (HS-SCCH), and the high-speed dedicated physical control channel (HS-DPCCH).

Among these physical channels, the HS-DPCCH carries the HARQ ACK/NACK signaling on the uplink to indicate whether a corresponding packet transmission was decoded successfully. That is, with respect to the downlink, the UE 810 provides feedback to the node B 808 over the HS-DPCCH to indicate whether it correctly decoded a packet on the downlink.

HS-DPCCH further includes feedback signaling from the UE 810 to assist the node B 808 in taking the right decision in terms of modulation and coding scheme and precoding weight selection, this feedback signaling including the CQI and PCI.

"HSPA Evolved" or HSPA+ is an evolution of the HSPA standard that includes MIMO and 64-QAM, enabling increased throughput and higher performance. That is, in an aspect of the disclosure, the node B 808 and/or the UE 810 may have multiple antennas supporting MIMO technology. The use of MIMO technology enables the node B 808 to exploit the spatial domain to support spatial multiplexing, beamforming, and transmit diversity.

Multiple Input Multiple Output (MIMO) is a term generally used to refer to multi-antenna technology, that is, multiple transmit antennas (multiple inputs to the channel) and multiple receive antennas (multiple outputs from the channel). MIMO systems generally enhance data transmission performance, enabling diversity gains to reduce multi-path fading and increase transmission quality, and spatial multiplexing gains to increase data throughput.

Spatial multiplexing may be used to transmit different streams of data simultaneously on the same frequency. The data steams may be transmitted to a single UE 810 to increase the data rate, or to multiple UEs 810 to increase the overall system capacity. This is achieved by spatially precoding each data stream and then transmitting each spatially precoded stream through a different transmit antenna on the downlink. The spatially precoded data streams arrive at the UE(s) 810 with different spatial signatures, which enables each of the UE(s) 810 to recover the one or more the data streams destined for that UE 810. On the uplink, each UE 810 may transmit one or more spatially precoded data streams, which enables the node B 808 to identify the source of each spatially precoded data stream.

Spatial multiplexing may be used when channel conditions are good. When channel conditions are less favorable, beamforming may be used to focus the transmission energy in one or more directions, or to improve transmission based on characteristics of the channel. This may be achieved by spatially precoding a data stream for transmission through multiple antennas. To achieve good coverage at the edges of the cell, a single stream beamforming transmission may be used in combination with transmit diversity.

Generally, for MIMO systems utilizing n transmit antennas, n transport blocks may be transmitted simultaneously over the same carrier utilizing the same channelization code. Note that the different transport blocks sent over the n transmit antennas may have the same or different modulation and coding schemes from one another.

On the other hand, Single Input Multiple Output (SIMO) generally refers to a system utilizing a single transmit antenna (a single input to the channel) and multiple receive antennas (multiple outputs from the channel). Thus, in a SIMO system, a single transport block is sent over the respective carrier.

Figure 9:
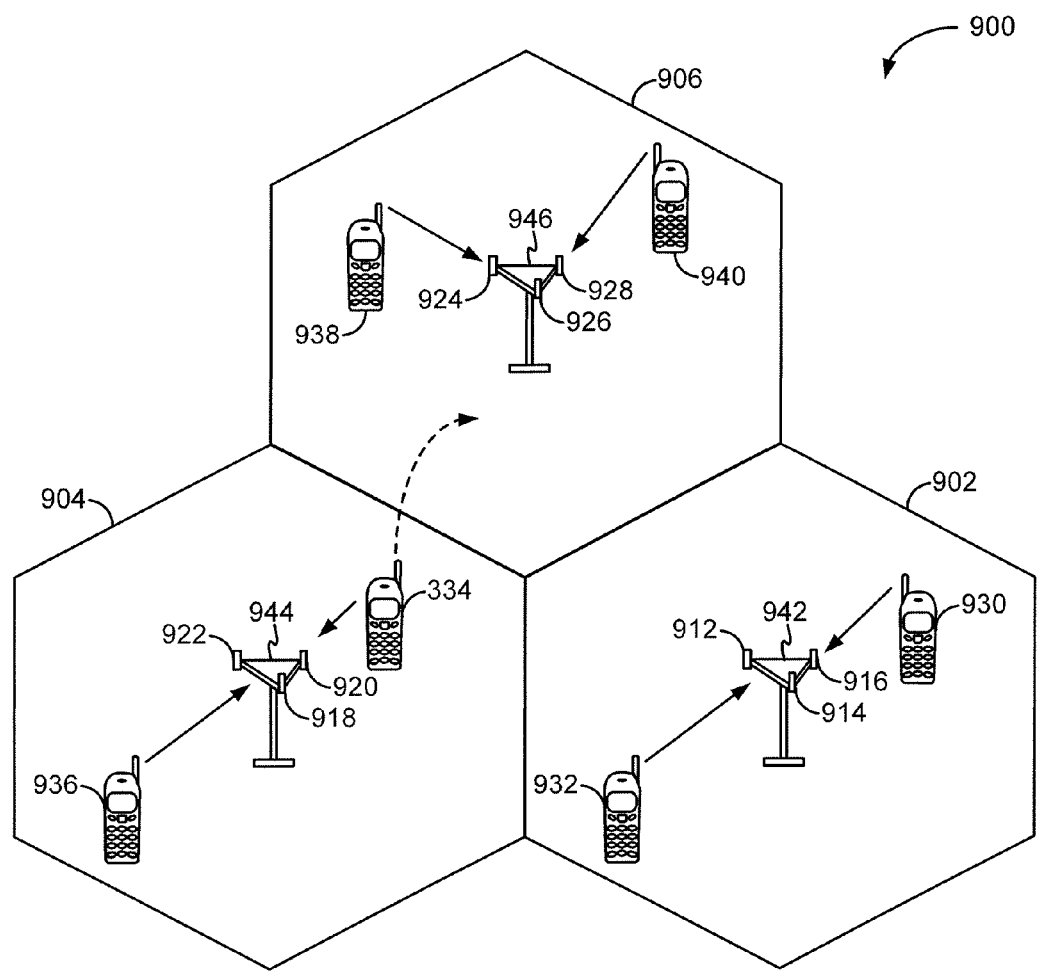
FIG. 9 is a conceptual diagram of an example of an access network for use with a UE configured to perform the functions described herein.

Referring to FIG. 9, an access network 900 in a UTRAN architecture is illustrated. The multiple access wireless communication system includes multiple cellular regions (cells), including cells 902, 904, and 906, each of which may include one or more sectors. The multiple sectors can be formed by groups of antennas with each antenna responsible for communication with UEs in a portion of the cell. For example, in cell 902, antenna groups 912, 914, and 916 may each correspond to a different sector. In cell 904, antenna groups 918, 920, and 922 each correspond to a different sector. In cell 906, antenna groups 924, 926, and 928 each correspond to a different sector. The cells 902, 904 and 906 may include several wireless communication devices, e.g., User Equipment or UEs, which may be in communication with one or more sectors of each cell 902, 904 or 906. For example, UEs 930 and 932 may be in communication with Node B 942, UEs 934 and 936 may be in communication with Node B 944, and UEs 938 and 940 can be in communication with Node B 946. Here, each Node B 942, 944, 946 is configured to provide an access point to a CN 804 (see FIG. 8) for all the UEs 930, 932, 934, 936, 938, 940 in the respective cells 902, 904, and 906. Node Bs 942, 944, 946 and UEs 930, 932, 934, 936, 938, 940 respectively may be configured to include, for example, the call processing component 140/150 (FIG. 2) implementing the components described above, such as, but not limited to Tx/Rx component 142/152, compressor component 144/154, and de-compressor component 146/156, as described above.

As the UE 934 moves from the illustrated location in cell 904 into cell 906, a serving cell change (SCC) or handover may occur in which communication with the UE 934 transitions from the cell 904, which may be referred to as the source cell, to cell 906, which may be referred to as the target cell. Management of the handover procedure may take place at the UE 934, at the Node Bs corresponding to the respective cells, at a radio network controller 806 (see FIG. 8), or at another suitable node in the wireless network. For example, during a call with the source cell 904, or at any other time, the UE 934 may monitor various parameters of the source cell 904 as well as various parameters of neighboring cells such as cells 906 and 902. Further, depending on the quality of these parameters, the UE 934 may maintain communication with one or more of the neighboring cells. During this time, the UE 934 may maintain an Active Set, that is, a list of cells that the UE 934 is simultaneously connected to (i.e., the UTRA cells that are currently assigning a downlink dedicated physical channel DPCH or fractional downlink dedicated physical channel F-DPCH to the UE 934 may constitute the Active Set).

The modulation and multiple access scheme employed by the access network 900 may vary depending on the particular telecommunications standard being deployed. By way of example, the standard may include Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. The standard may alternately be Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), and Flash-OFDM employing OFDMA. CDMA2000 and UMB are described in documents from the 3GPP2 organization. The actual wireless communication standard and the multiple access technology employed will depend on the specific application and the overall design constraints imposed on the system.

The radio protocol architecture may take on various forms depending on the particular application. An example for an HSPA system will now be presented with reference to FIG. 10.

Figure 10:
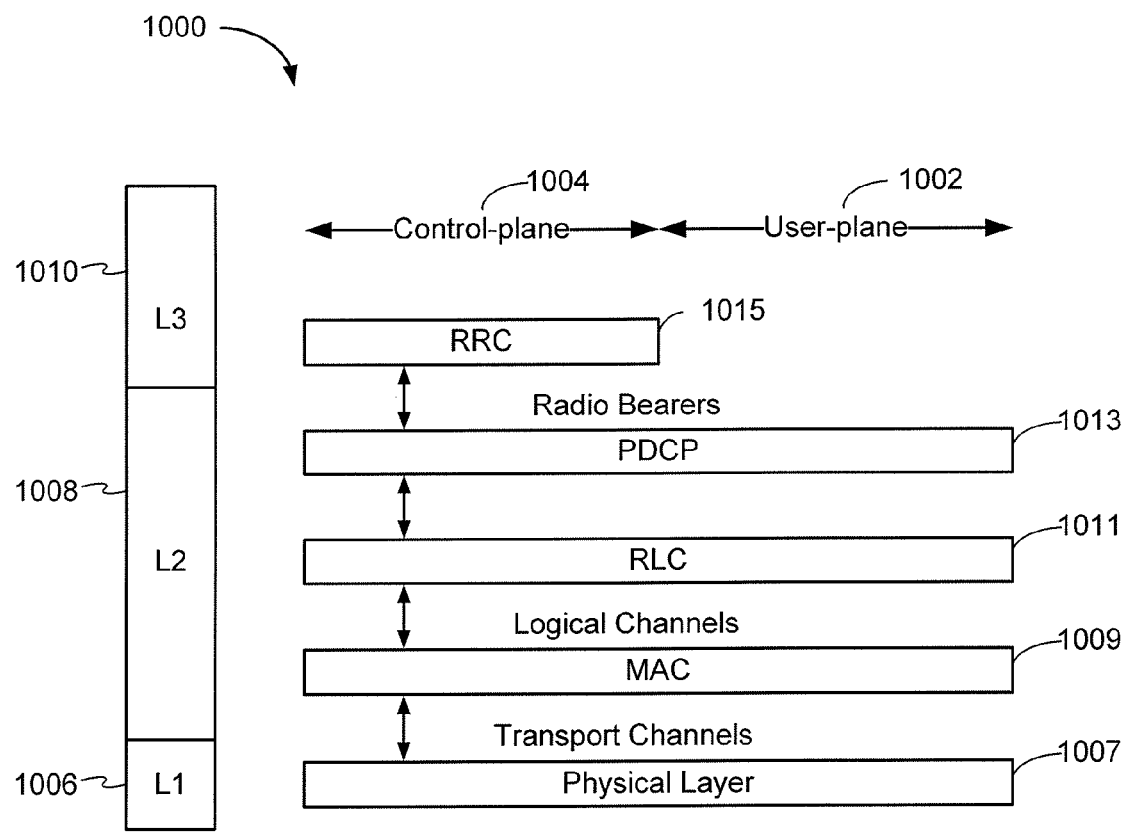
FIG. 10 is a conceptual diagram of an example of a radio protocol architecture for the user and control planes for a base station and/or a UE configured to perform the functions described herein.

FIG. 10 is a conceptual diagram illustrating an example of the radio protocol architecture 1000 for the user plane 1002 and the control plane 1004 of a user equipment (UE) or node B/base station. For example, architecture 1000 may be included in a network entity and/or UE such as an entity within network 112 and/or UE 114 (FIG. 1). The radio protocol architecture 1000 for the UE and node B is shown with three layers: Layer 1 1006, Layer 2 1008, and Layer 3 1010. Layer 1 1006 is the lowest lower and implements various physical layer signal processing functions. As such, Layer 1 1006 includes the physical layer 1007. Layer 2 (L2 layer) 1008 is above the physical layer 1007 and is responsible for the link between the UE and node B over the physical layer 1007. Layer 3 (L3 layer) 1010 includes a radio resource control (RRC) sublayer 1015. The RRC sublayer 1015 handles the control plane signaling of Layer 3 between the UE and the UTRAN.

In the user plane, the L2 layer 1008 includes a media access control (MAC) sublayer 1009, a radio link control (RLC) sublayer 1011, and a packet data convergence protocol (PDCP) 1013 sublayer, which are terminated at the node B on the network side. Although not shown, the UE may have several upper layers above the L2 layer 1008 including a network layer (e.g., IP layer) that is terminated at a PDN gateway on the network side, and an application layer that is terminated at the other end of the connection (e.g., far end UE, server, etc.).

The PDCP sublayer 1013 provides multiplexing between different radio bearers and logical channels. The PDCP sublayer 1013 also provides header compression for upper layer data packets to reduce radio transmission overhead, security by ciphering the data packets, and handover support for UEs between node Bs. The RLC sublayer 1011 provides segmentation and reassembly of upper layer data packets, retransmission of lost data packets, and reordering of data packets to compensate for out-of-order reception due to hybrid automatic repeat request (HARQ). The MAC sublayer 1009 provides multiplexing between logical and transport channels. The MAC sublayer 1009 is also responsible for allocating the various radio resources (e.g., resource blocks) in one cell among the UEs. The MAC sublayer 1009 is also responsible for HARQ operations.

Figure 11:
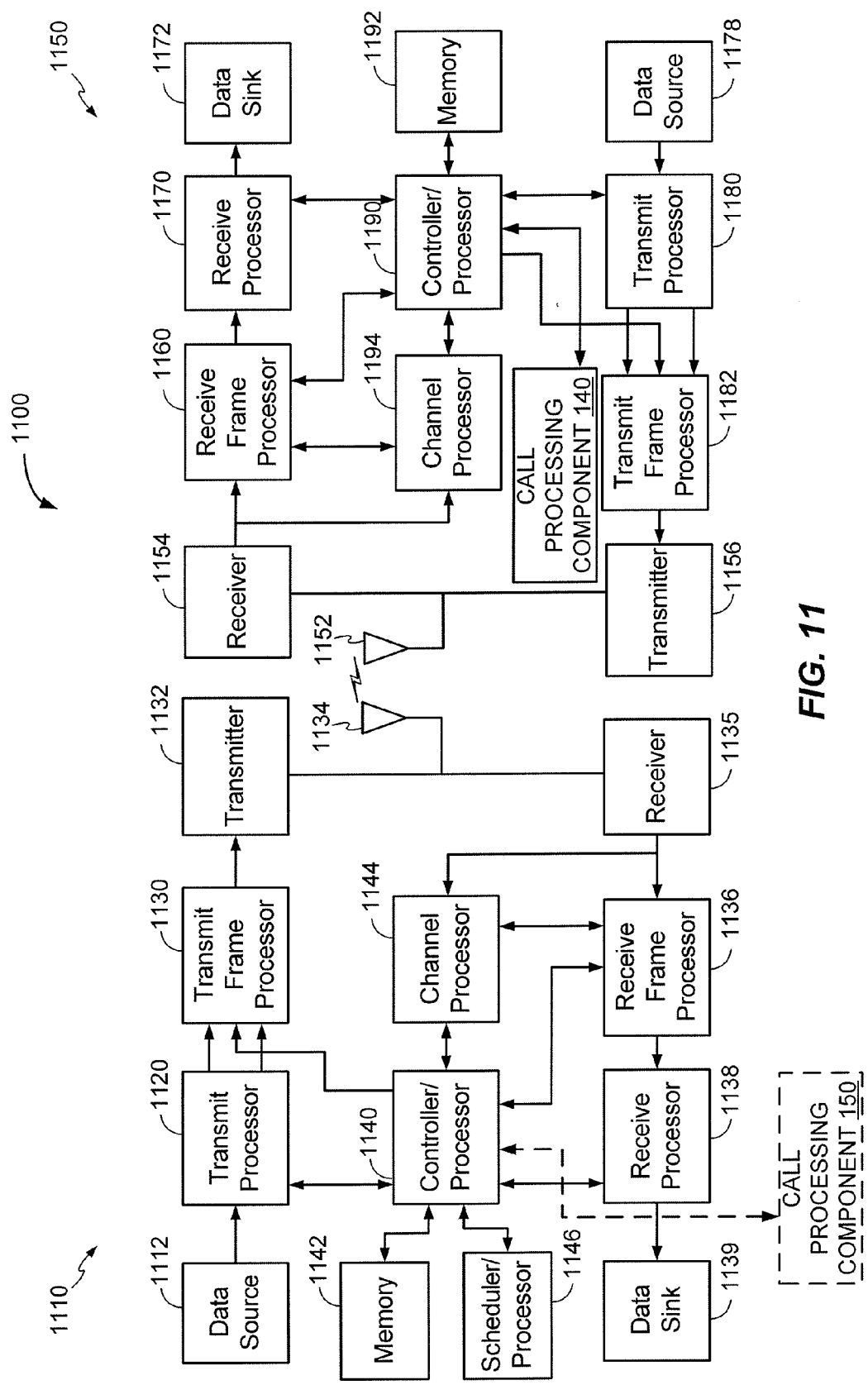
FIG. 11 is a block diagram of an example of a Node B in communication with a UE in a telecommunications system configured to perform the functions described herein.

FIG. 11 is a block diagram of a communication system 1100 including a Node B 1110 in communication with a UE 1150, where Node B 1110 may be an entity within network 112 and the UE 1150 may be UE 114 according to the aspect described in FIG. 1. UE 1150 and Node B 1110 may be configured to include, for example, the call processing component 140/150 (FIG. 2) implementing the components described above, such as, but not limited to Tx/Rx component 142/152, compressor component 144/154, and decompressor component 146/156, as described above. In the downlink communication, a transmit processor 1120 may receive data from a data source 1112 and control signals from a controller/processor 1140. The transmit processor 1120 provides various signal processing functions for the data and control signals, as well as reference signals (e.g., pilot signals). For example, the transmit processor 1120 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols. Channel estimates from a channel processor 1144 may be used by a controller/processor 1140 to determine the coding, modulation, spreading, and/or scrambling schemes for the transmit processor 1120. These channel estimates may be derived from a reference signal transmitted by the UE 1150 or from feedback from the UE 1150. The symbols generated by the transmit processor 1120 are provided to a transmit frame processor 1130 to create a frame structure. The transmit frame processor 1130 creates this frame structure by multiplexing the symbols with information from the controller/processor 1140, resulting in a series of frames. The frames are then provided to a transmitter 1132, which provides various signal conditioning functions including amplifying, filtering, and modulating the frames onto a carrier for downlink transmission over the wireless medium through antenna 1134. The antenna 1134 may include one or more antennas, for example, including beam steering bidirectional adaptive antenna arrays or other similar beam technologies.

At the UE 1150, a receiver 1154 receives the downlink transmission through an antenna 1152 and processes the transmission to recover the information modulated onto the carrier. The information recovered by the receiver 1154 is provided to a receive frame processor 1160, which parses each frame, and provides information from the frames to a channel processor 1194 and the data, control, and reference signals to a receive processor 1170. The receive processor 1170 then performs the inverse of the processing performed by the transmit processor 1120 in the Node B 1110. More specifically, the receive processor 1170 descrambles and despreads the symbols, and then determines the most likely signal constellation points transmitted by the Node B 1110 based on the modulation scheme. These soft decisions may be based on channel estimates computed by the channel processor 1194. The soft decisions are then decoded and deinterleaved to recover the data, control, and reference signals. The CRC codes are then checked to determine whether the frames were successfully decoded. The data carried by the successfully decoded frames will then be provided to a data sink 1172, which represents applications running in the UE 1150 and/or various user interfaces (e.g., display). Control signals carried by successfully decoded frames will be provided to a controller/processor 1190.

When frames are unsuccessfully decoded by the receiver processor 1170, the controller/processor 1190 may also use an acknowledgement (ACK) and/or negative acknowledgement (NACK) protocol to support retransmission requests for those frames.

In the uplink, data from a data source 1178 and control signals from the controller/processor 1190 are provided to a transmit processor 1180. The data source 1178 may represent applications running in the UE 1150 and various user interfaces (e.g., keyboard). Similar to the functionality described in connection with the downlink transmission by the Node B 1110, the transmit processor 1180 provides various signal processing functions including CRC codes, coding and interleaving to facilitate FEC, mapping to signal constellations, spreading with OVSFs, and scrambling to produce a series of symbols. Channel estimates, derived by the channel processor 1194 from a reference signal transmitted by the Node B 1110 or from feedback contained in the midamble transmitted by the Node B 1110, may be used to select the appropriate coding, modulation, spreading, and/or scrambling schemes. The symbols produced by the transmit processor 1180 will be provided to a transmit frame processor 1182 to create a frame structure. The transmit frame processor 1182 creates this frame structure by multiplexing the symbols with information from the controller/processor 1190, resulting in a series of frames. The frames are then provided to a transmitter 1156, which provides various signal conditioning functions including amplification, filtering, and modulating the frames onto a carrier for uplink transmission over the wireless medium through the antenna 1152.

The uplink transmission is processed at the Node B 1110 in a manner similar to that described in connection with the receiver function at the UE 1150. A receiver 1135 receives the uplink transmission through the antenna 1134 and processes the transmission to recover the information modulated onto the carrier. The information recovered by the receiver 1135 is provided to a receive frame processor 1136, which parses each frame, and provides information from the frames to the channel processor 1144 and the data, control, and reference signals to a receive processor 1138. The receive processor 1138 performs the inverse of the processing performed by the transmit processor 1180 in the UE 1150. The data and control signals carried by the successfully decoded frames may then be provided to a data sink 1139 and the controller/processor, respectively. If some of the frames were unsuccessfully decoded by the receive processor, the controller/processor 1140 may also use an acknowledgement (ACK) and/or negative acknowledgement (NACK) protocol to support retransmission requests for those frames.

The controller/processors 1140 and 1190 may be used to direct the operation at the Node B 1110 and the UE 1150, respectively. For example, the controller/processors 1140 and 1190 may provide various functions including timing, peripheral interfaces, voltage regulation, power management, and other control functions. The computer readable media of memories 1142 and 1192 may store data and software for the Node B 1110 and the UE 1150, respectively. A scheduler/processor 1146 at the Node B 1110 may be used to allocate resources to the UEs and schedule downlink and/or uplink transmissions for the UEs.

Several aspects of a telecommunications system have been presented with reference to a W-CDMA system. As those skilled in the art will readily appreciate, various aspects described throughout this disclosure may be extended to other telecommunication systems, network architectures and communication standards.

By way of example, various aspects may be extended to other UMTS systems such as TD-SCDMA, High Speed Downlink Packet Access (HSDPA), High Speed Uplink Packet Access (HSUPA), High Speed Packet Access Plus (HSPA+) and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

In accordance with various aspects of the disclosure, an element, or any portion of an element, or any combination of elements may be implemented with a "processing system" or processor (FIG. 7 or 11) that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. The computer-readable medium may be a non-transitory computer-readable medium. A non-transitory computer-readable medium includes, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method of synchronizing compression for communication between a user equipment (UE) and a serving node, comprising:
    determining that a compressor memory of a compressor and a decompressor memory of a decompressor are out-of-synchronization based on a checksum failure; and
    resetting the compressor memory and the decompressor memory to a predetermined state in response to determining that the compressor memory and the decompressor memory are out-of-synchronization, wherein the compressor memory and the decompressor memory are synchronized at the predetermined state, wherein resetting the compressor memory and the decompressor memory to the predetermined state further comprises initiating a Radio Link Control (RLC) RESET procedure based on the checksum failure, and wherein the RLC RESET procedure comprises flushing the compressor memory and the decompressor memory.

2. The method of claim 1, wherein flushing the compressor memory and the decompressor memory further comprises:
    flushing the decompressor memory to obtain the predetermined state; and
    transmitting an RLC RESET signal to the compressor, wherein the RLC RESET signal causes the compressor to flush the compressor memory to obtain the predetermined state.

3. The method of claim 2, wherein the RLC RESET signal further causes the compressor to flush the compressor memory to obtain the predetermined state further comprises flushing one or more compressed RLC Service Data Units (SDUs).

4. The method of claim 1, wherein resetting the compressor memory and the decompressor memory to the predetermined state further comprises:
    disabling the decompressor in response to determining that the compressor memory and the decompressor memory are out-of-synchronization;
    transmitting a disable command signal to the compressor, wherein the disable command signal disables the compressor from compressing one or more data packets;
    re-enabling the decompressor, wherein re-enabling the decompressor causes the decompressor to flush the decompressor memory to obtain the predetermined state; and
    transmitting a re-enable command signal to the compressor, wherein the re-enable command signal enables the compressor to compress the one or more data packets, and wherein the re-enable command signal causes the compressor to flush the compressor memory to obtain the predetermined state.

5. The method of claim 1, wherein determining that the compressor memory and the decompressor memory are out-of-synchronization based on the checksum failure further comprises:
    decompressing, by the decompressor, a compressed data packet to form a decompressed data packet;
    calculating a checksum for the decompressed data packet;
    determining whether the checksum for the decompressed data packet matches a checksum for an original data packet, wherein the original data packet corresponds to an uncompressed version of the compressed data packet; and
    indicating the checksum failure when the checksum for the decompressed data packet does not match the checksum for the original data packet.

6. The method of claim 5, wherein the checksum for the original data packet is calculated for only a portion of a total number of bytes of the original data packet and is appended to a header of the compressed data packet prior to transmission of the compressed data packet.

7. The method of claim 6, wherein calculating the checksum for the decompressed data packet further comprises calculating the checksum for at least one or both of an Internet Protocol (IP) and Transmission Control Protocol (TCP) layer on the decompressed data packet, and wherein the checksum for the original data packet corresponds to the checksum for at least one or both of an Internet Protocol (IP) and Transmission Control Protocol (TCP) layer on original data packet.

8. The method of claim 1, further comprising receiving a point-to-point acknowledge (PTP ACK) signal, wherein the PTP ACK signal corresponds to the compressor compressing one or more data packets based on a configuration request sent prior to the resetting of the compressor memory and the decompressor memory.

9. The method of claim 1, further comprising:
    receiving a compressed data packet after the resetting of the compressor memory and the decompressor memory, wherein the compressed data packet comprises an Internet Protocol Data Compression (IPDC) sequence number (SN) appended to a header of the compressed data packet;
    determining whether the IPDC SN of the compressed data packet matches one or more IPDC SNs corresponding to one or more previously received compressed data packets; and discarding the compressed data packet when the IPDC SN of the compressed data packet matches one or more previously received IPDC SNs.

10. The method of claim 9, wherein the one or more previously received compressed data packets were received prior to resetting the compressor memory and the decompressor memory to the predetermined state.

11. An apparatus for synchronizing compression for communication between a user equipment (UE) and a serving node, comprising:
    means for determining that a compressor memory of a compressor and a decompressor memory of a decompressor are out-of-synchronization based on a checksum failure; and
    means for resetting the compressor memory and the decompressor memory to a predetermined state in response to determining that the compressor memory and the decompressor memory are out-of-synchronization, wherein the compressor memory and the decompressor memory are synchronized at the predetermined state, wherein the means for resetting the compressor memory and the decompressor memory to the predetermined state further comprises means for initiating a Radio Link Control (RLC) RESET procedure based on the checksum failure, and wherein the RLC RESET procedure comprises means for flushing the compressor memory and the decompressor memory.

12. An apparatus for synchronizing compression for communication between a user equipment (UE) and a serving node, comprising:
    a memory configured to store data; and
    one or more processors communicatively coupled with the memory, the one or more processors and the memory being configured to:
        determine that a compressor memory of a compressor and a decompressor memory of a decompressor are out-of-synchronization based on a checksum failure; and
        reset the compressor memory and the decompressor memory to a predetermined state in response to determining that the compressor memory and the decompressor memory are out-of-synchronization, wherein the compressor memory and the decompressor memory are synchronized at the predetermined state, wherein to reset the compressor memory and the decompressor memory to the predetermined state the one or more processors is further configured to initiate a Radio Link Control (RLC) RESET procedure based on the checksum failure, and wherein the RLC RESET procedure comprises flushing the compressor memory and the decompressor memory.

13. The apparatus of claim 12, wherein flushing the compressor memory and the decompressor memory further comprises:
    flushing the decompressor memory to obtain the predetermined state; and
    transmitting an RLC RESET signal to the compressor, wherein the RLC RESET signal causes the compressor to flush the compressor memory to obtain the predetermined state.

14. The apparatus of claim 13, wherein the RLC RESET signal further causes the compressor to flush the compressor memory to obtain the predetermined state further comprises flushing one or more compressed RLC Service Data Units (SDUs).

15. The apparatus of claim 12, wherein to reset the compressor memory and the decompressor memory to the predetermined state the one or more processors are further configured to:
    disable the decompressor in response to determining that the compressor memory and the decompressor memory are out-of-synchronization;
    transmit a disable command signal to the compressor, wherein the disable command signal disables the compressor from compressing one or more data packets;
    re-enable the decompressor, wherein re-enabling the decompressor causes the decompressor to flush the decompressor memory to obtain the predetermined state; and
    transmit a re-enable command signal to the compressor, wherein the re-enable command signal enables the compressor to compress the one or more data packets, and wherein the re-enable command signal causes the compressor to flush the compressor memory to obtain the predetermined state.

16. The apparatus of claim 12, wherein to determine that the compressor memory and the decompressor memory are out-of-synchronization based on the checksum failure one or more processors are further configured to:
    decompress, by the decompressor, a compressed data packet to form a decompressed data packet;
    calculate a checksum for the decompressed data packet;
    determine whether the checksum for the decompressed data packet matches a checksum for an original data packet, wherein the original data packet corresponds to an uncompressed version of the compressed data packet; and
    indicate the checksum failure when the checksum for the decompressed data packet does not match the checksum for the original data packet.

17. The apparatus of claim 16, wherein the checksum for the original data packet is calculated for only a portion of a total number of bytes of the original data packet and is appended to a header of the compressed data packet prior to transmission of the compressed data packet.

18. The apparatus of claim 17, wherein calculating the checksum for the decompressed data packet further comprises calculating the checksum for at least one or both of an Internet Protocol (IP) and Transmission Control Protocol (TCP) layer on the decompressed data packet, and wherein the checksum for the original data packet corresponds to the checksum for at least one or both of an Internet Protocol (IP) and Transmission Control Protocol (TCP) layer on original data packet.

19. The apparatus of claim 12, wherein the one or more processors are further configured to receive a point-to-point acknowledge (PTP ACK) signal, wherein the PTP ACK signal corresponds to the compressor compressing one or more data packets based on a configuration request sent prior to the resetting of the compressor memory and the decompressor memory.

20. The apparatus of claim 12, wherein the one or more processors are further configured to:
    receive a compressed data packet after the resetting of the compressor memory and the decompressor memory, wherein the compressed data packet comprises an Internet Protocol Data Compression (IPDC) sequence number (SN) appended to a header of the compressed data packet;

determine whether the IPDC SN of the compressed data packet matches one or more IPDC SNs corresponding to one or more previously received compressed data packets; and discard the compressed data packet when the IPDC SN of the compressed data packet matches one or more previously received IPDC SNs.

21. The apparatus of claim 20, wherein the one or more previously received compressed data packets were received prior to resetting the compressor memory and the decompressor memory to the predetermined state.

22. A non-transitory computer-readable medium storing computer executable code for synchronizing compression for communication between a user equipment (UE) and a serving node, comprising:

code for determining that a compressor memory of a compressor and a decompressor memory of a decompressor are out-of-synchronization based on a checksum failure; and code for resetting the compressor memory and the decompressor memory to a predetermined state in response to determining that the compressor memory and the decompressor memory are out-of-synchronization, wherein the compressor memory and the decompressor memory are synchronized at the predetermined state, wherein the code for resetting the compressor memory and the decompressor memory to the predetermined state further comprises code for initiating a Radio Link Control (RLC) RESET procedure based on the checksum failure, and wherein the RLC RESET procedure comprises code for flushing the compressor memory and the decompressor memory.

\* \* \* \* \*